(12) United States Patent
Froggatt et al.

(10) Patent No.: US 9,784,569 B2
(45) Date of Patent: Oct. 10, 2017

(54) METHODS AND APPARATUS TO DETERMINE STRAIN ON AN OPTICAL CORE BASED ON TRACKED CHANGE IN PHASE

(71) Applicant: Intuitive Surgical Operations, Inc., Sunnyvale, CA (US)

(72) Inventors: Mark E. Froggatt, Blacksburg, VA (US); Justin W. Klein, Blacksburg, VA (US); Dawn K. Gifford, Blacksburg, VA (US); Stephen Tod Kreger, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 531 days.

(21) Appl. No.: 14/326,004

(22) Filed: Jul. 8, 2014

(65) Prior Publication Data

US 2014/0320846 A1 Oct. 30, 2014
US 2017/0003119 A9 Jan. 5, 2017

Related U.S. Application Data

(63) Continuation of application No. 12/874,901, filed on Sep. 2, 2010, now Pat. No. 8,773,650.
(Continued)

(51) Int. Cl.
*G01B 11/24* (2006.01)
*G01B 11/16* (2006.01)
(Continued)

(52) U.S. Cl.
CPC .............. *G01B 11/24* (2013.01); *G01B 11/16* (2013.01); *G01B 11/168* (2013.01); *G01B 11/18* (2013.01); *G01L 1/242* (2013.01); *G02B 6/02042* (2013.01)

(58) Field of Classification Search
CPC ....... G01B 11/18; G01B 11/16; G01B 11/161; G01B 11/165; G01B 11/168; G01B 11/24;
(Continued)

(56) References Cited

U.S. PATENT DOCUMENTS 4,697,926 A 10/1987 Youngquist et al.
4,748,686 A 5/1988 Glomb
(Continued)

FOREIGN PATENT DOCUMENTS

CN 1841027 A 10/2006
CN 1880913 A 12/2006
(Continued)

OTHER PUBLICATIONS

Askins C.G., et al., Inscription of Fiber Bragg Gratings in Multicore Fiber, in Nonlinear Photonics, OSA Technical Digest (CD), Optical Society of America, 2007, paper JWA39.
(Continued)

*Primary Examiner* — Gordon J Stock, Jr.
(74) *Attorney, Agent, or Firm* — Nixon & Vanderhye P.C.

(57) ABSTRACT

An accurate measurement method and apparatus using an optical fiber are disclosed. A total change in optical length in an optical core in the optical fiber is determined that reflects an accumulation of all of the changes in optical length for multiple segment lengths of the optical core up to a point on the optical fiber. The total change in optical length in the optical core is provided for calculation of an average strain over a length of the optical core based on the detected total change in optical length.

21 Claims, 18 Drawing Sheets

Related U.S. Application Data

(60) Provisional application No. 61/350,343, filed on Jun. 1, 2010, provisional application No. 61/255,575, filed on Oct. 28, 2009, provisional application No. 61/243,746, filed on Sep. 18, 2009.

(51) Int. Cl.
*G01L 1/24* (2006.01)
*G02B 6/02* (2006.01)

(58) Field of Classification Search
CPC ............ G01B 2290/45; G01B 9/02004; G01B 9/02023; G01B 9/02027; G01B 9/02056; G01L 1/242; G01L 1/246; G01D 5/35316; G01D 5/35361; G01D 5/3538; G01D 5/35354; G01K 11/32; G01K 11/3206; G01M 11/30; G01M 11/31; G01M 11/3172
See application file for complete search history.

(56) References Cited

U.S. PATENT DOCUMENTS

| | | | |
|---|---|---|---|
| 4,761,073 A | | 8/1988 | Meltz et al. |
| 5,009,505 A | * | 4/1991 | Malvern .............. G01K 11/32 250/227.19 |
| 5,118,931 A | * | 6/1992 | Udd .................. G01D 5/35383 250/227.16 |
| 5,263,103 A | | 11/1993 | Kosinski |
| 5,493,113 A | * | 2/1996 | Dunphy ............. G01D 5/35383 250/227.14 |
| 5,627,637 A | * | 5/1997 | Kapteyn ............... G01B 11/18 356/32 |
| 5,698,848 A | * | 12/1997 | Belk .................. G01D 5/35383 250/227.11 |
| 5,748,312 A | * | 5/1998 | Kersey ................. G01L 1/246 250/227.23 |
| 5,798,521 A | | 8/1998 | Froggatt |
| 5,987,197 A | | 11/1999 | Kersey |
| 6,023,325 A | * | 2/2000 | Sahlgren ............ B23Q 11/141 356/43 |
| 6,141,098 A | | 10/2000 | Sawatari et al. |
| 6,289,740 B1 | * | 9/2001 | Posey, Jr. .............. G01L 1/246 250/227.18 |
| 6,301,420 B1 | | 10/2001 | Greenaway et al. |
| 6,389,187 B1 | | 5/2002 | Greenaway et al. |
| 6,545,760 B1 | | 4/2003 | Froggatt et al. |
| 6,621,956 B2 | | 9/2003 | Greenaway et al. |
| 6,856,400 B1 | | 2/2005 | Froggatt |
| 6,888,623 B2 | | 5/2005 | Clements |
| 6,900,897 B2 | | 5/2005 | Froggatt |
| 7,027,699 B2 | | 4/2006 | Tao et al. |
| 7,042,573 B2 | | 5/2006 | Froggatt |
| 7,324,714 B1 | | 1/2008 | Cranch et al. |
| 7,330,245 B2 | | 2/2008 | Froggatt |
| 7,379,168 B2 | | 5/2008 | Froggatt et al. |
| 7,440,087 B2 | | 10/2008 | Froggatt et al. |
| 7,538,883 B2 | | 5/2009 | Froggatt |
| 7,664,347 B2 | | 2/2010 | Childers et al. |
| 7,720,322 B2 | | 5/2010 | Prisco |
| 7,772,541 B2 | | 8/2010 | Froggatt et al. |
| 7,781,724 B2 | | 8/2010 | Childers et al. |
| 7,813,599 B2 | | 10/2010 | Moore |
| 7,815,376 B2 | | 10/2010 | Rogers et al. |
| 7,930,065 B2 | | 4/2011 | Larkin et al. |
| 8,183,520 B2 | | 5/2012 | Prisco |
| 8,400,620 B2 | | 3/2013 | Froggatt et al. |
| 8,531,655 B2 | | 9/2013 | Klein et al. |
| 8,746,076 B2 | * | 6/2014 | Rogge ................... G01L 1/24 385/12 |
| 8,773,650 B2 | | 7/2014 | Froggatt et al. |
| 8,842,963 B2 | | 9/2014 | Wysocki et al. |
| 8,970,845 B1 | * | 3/2015 | Chan ................. G01M 11/30 356/478 |
| 9,025,158 B2 | | 5/2015 | Froggatt et al. |
| 2001/0017971 A1 | | 8/2001 | Iwata et al. |
| 2002/0028034 A1 | * | 3/2002 | Chen ...................... G01L 1/242 385/12 |
| 2005/0089326 A1 | | 4/2005 | Regev et al. |
| 2005/0226584 A1 | * | 10/2005 | Williams ................. D04C 1/02 385/130 |
| 2006/0013523 A1 | | 1/2006 | Childers et al. |
| 2006/0061770 A1 | | 3/2006 | Erskine |
| 2006/0152733 A1 | | 7/2006 | Waagaard et al. |
| 2006/0188212 A1 | | 8/2006 | Oron et al. |
| 2007/0065077 A1 | | 3/2007 | Childers et al. |
| 2008/0212082 A1 | | 9/2008 | Froggatt et al. ............. 356/73.1 |
| 2011/0202069 A1 | | 8/2011 | Prisco et al. |
| 2011/0301455 A1 | | 12/2011 | Numajiri et al. |
| 2011/0310378 A1 | | 12/2011 | Froggatt et al. |
| 2012/0062901 A1 | | 3/2012 | Yoshida et al. |

FOREIGN PATENT DOCUMENTS

| | | |
|---|---|---|
| CN | 1954218 A | 4/2007 |
| DE | 3921440 A1 | 1/1991 |
| JP | H0293503 A | 4/1990 |
| JP | H08334649 A | 12/1996 |
| JP | 3159861 B2 | 4/2001 |
| WO | WO-0138914 A1 | 5/2001 |
| WO | WO-0233464 A1 | 4/2002 |

OTHER PUBLICATIONS

Askins, Charles G. et al., "Bend and Twist Sensing in a Multi-Core Optical Fiber," Optical Fiber Communications/National Fiber Optic Engineers conference, 2008 (OFC/NFOEC 2008), Feb. 24-28, 2008, San Diego, CA, pp. 1-3, IEEE.

Blanchard P.M., et al., "Two-Dimensional Bend Sensing with a Single, Multi-Core Optical Fibre," Smart Materials and Structures, 2000, vol. 9 (2), pp. 132-140.

Blandino J., et al., Three-Dimensional Shape Sensing for Inflatable Booms, Proceedings of the 46th AIAA/ASME/ASCE/AHS/ASC Structures, Structural Dynamics and Materials Conference, 2005.

Co-pending U.S. Appl. No. 11/690,116, filed Mar. 22, 2007.
Co-pending U.S. Appl. No. 12/106,254, filed Apr. 18, 2008.
Co-pending U.S. Appl. No. 12/236,478, filed Sep. 23, 2008.
Co-pending U.S. Appl. No. 12/614,309, filed Nov. 6, 2009.
Co-pending U.S. Appl. No. 13/073,295, filed Mar. 28, 2011.

Cranch C.A., et al., "Ultra-High-Sensitivity Two-Dimensional Bend Sensor," Electronics Letters, 2006, vol. 42 (9), pp. 520-522.

Cranch G.A., et al., Ultra-High Sensitivity Curvature Sensor Based on Bragg Grating Defined Interferometric Cavities Formed in Multicore Fiber, in Optical Fiber Sensors, OSA Technical Digest (CD), Optical Society of America, 2006, paper ThB3.

Duncan R., et al., "Fiber-Optic Shape and Position Sensing," Proceedings of the 5th International Conference on Structural Health Monitoring, 2005.

Duncan R.G., et al., "High-Accuracy Fiber-Optic Shape Sensing," Proceedings of SPIE—International Symposium on Smart Structures and Materials, 2007, vol. 6530.

Duncan, Roger, "Sensing Shape: Fiber-Bragg-grating sensor arrays monitor shape at a high resolution," 2005, pp. 18-21, SPIE.

Duncan, Roger G. et al., "Characterization of a Fiber-Optic Shape and Position Sensor," Proc. of SPIE, 2006, pp. 616704-1-616704-11, vol. 6167, SPIE.

Flockhart G.M.H., et al., "Differential Phase Tracking Applied to Bragg Gratings in Multi-Core Fibre for High Accuracy Curvature Measurement," Electronics Letters, 2006, vol. 42 (7), pp. 390-391.

Flockhart G.M.H., et al., "Two-Axis Bend Measurement with Bragg Gratings in Multicore Optical Fiber," Optics Letters, 2003, vol. 28 (6), pp. 387-389.

Froggatt, Mark and Jason Moore, "Distributed measurement of static strain in an optical fiber with multiple Bragg gratings at nominally equal wavelengths," Journal of Applied Optics, Apr. 1, 1998, vol. 37, Issue 10, pp. 1741-1746.

(56) References Cited

OTHER PUBLICATIONS

Gordon M.H.Flockhart, et al., "Differential Phase Tracking Applied to Bragg Gratings in Multicore Fiber for High-Accuracy Curvature Measurement," Proc. SPIE, 2006, vol. 6167.
International Preliminary Report on Patentability for Application No. PCT/US2011/037518, mailed on Dec. 4, 2012, 6 pages.
International Search Report and Written Opinion for Application No. PCT/US2011/037518, mailed on Feb. 9, 2012, 10 pages.
International Search Report and Written Opinion for Application No. PCT/US2011/038512, mailed on Feb. 9, 2012, 8 pages.
International Search Report and Written Opinion for Application No. PCT/US2011/049934, mailed on Mar. 28, 2012, 6 pages.
Klute S., et al., "Fiber-Optic Shape Sensing and Distributed Strain Measurements on a Morphing Chevron," American Institute of Aeronautics and Astronautics, 2006, pp. 1-23.
MacPherson W.N., et al., "Pitch and Roll Sensing Using Fibre Bragg Gratings in Multicore Fibre," Measurement Science and Technology, 2004, vol. 15 (8), pp. 1642.
Miller G.A., et al., "Shape Sensing Using Distributed Fiber Optic Strain Measurements," Proceedings of SPIE—Second European Workshop on Optical Fibre Sensors, 2004, vol. 5502, pp. 528-531.
Zhao D., et al., "Implementation of Vectorial Bend Sensors Using Long-Period Gratings UV-Inscribed in Special Shape Fibres," Measurement Science and Technology, 2004, vol. 15 (8), pp. 1647-1650.
Chinese Office Action and English Translation mailed Jan. 23, 2014 in Chinese Application No. CN 201080041709.6.
International Preliminary Report on Patentability and Written Opinion of the International Search Authority mailed Mar. 29, 2012 in corresponding Application No. PCT/US2010./002517.
Notification of Transmittal of International Search Report and Written Opinion of the International Searching Authority mailed Jun. 1, 2011 in corresponding Application No. PCT/US2010/002517.
Extended European Search Report for Application No. 11822548.1, mailed on Feb. 21, 2017, 8 pages.

\* cited by examiner

METHODS AND APPARATUS TO DETERMINE STRAIN ON AN OPTICAL CORE BASED ON TRACKED CHANGE IN PHASE

PRIORITY APPLICATIONS

This application claims priority U.S. patent application Ser. No. 12/874,901, filed Sep. 2, 2010, which claims priority from U.S. provisional patent applications 61/350,343, filed on Jun. 1, 2010, 61/255,575, filed on Oct. 28, 2009, and 61/243,746, filed on Sep. 18, 2009, the contents of which are incorporated herein by reference.

TECHNICAL FIELD

The technical field relates to optical measurements.

BACKGROUND

Shape measurement is a general term that includes sensing a structure's position in three dimensional space. This measurement coincides with what the human eye perceives as the position of an object. Since the eyes continually perform this task, one might assume that the measurement is simple. If one considers a length of rope, one can physically measure the position at every inch along the rope to estimate the shape. But this task is tedious and is increasingly difficult with more complex shapes. Another consideration is how to perform the measurement if the rope cannot be physically reached or seen. If the rope is contained within a sealed box, its position cannot be determined by conventional measurement techniques. The rope in this example can be replaced with an optical fiber.

Sensing the shape of a long and slender deformed cylinder, such as an optical fiber, is useful in many applications ranging for example, from manufacturing and construction to medicine and aerospace. In most of these applications, the shape sensing system must be able to accurately determine the position of the fiber, e.g., within less than one percent of its length, and in many cases, less than one tenth of one percent of its length. There are a number of approaches to the shape measurement problem, but none adequately addresses the requirements of most applications because they are too slow, do not approach the required accuracies, do not function in the presence of tight bends, or fail to adequately account for twist of the fiber. In many applications, the presence of torsional forces that twist the fiber undermine the accuracy, and thus, usefulness of these approaches.

Conventional approaches to measuring the shape of a fiber use strain as the fundamental measurement signal. Strain is a ratio of the change in length of a fiber segment post-stress verses the original length of that segment (pre-stress). As an object like a fiber is bent, material on the outside of the bend is elongated, while the material on the inside of the bend is compressed. Knowing these changes in local strain and knowing the original position of the object, an approximation of the new position of the fiber can be made.

In order to effectively sense position with high accuracy, several key factors must be addressed. First, for a strain-based approach, the strain measurements are preferably accurate to tens of nanostrain (10 parts per billion) levels. But high accuracy strain measurements are not readily attainable by conventional resistive or optical strain gauges. Therefore, a new technique to measure the strain to extremely high accuracy must be devised that is not strain-based in the conventional sense.

Second, the presence of twist in the optical fiber must be measured to a high degree of accuracy and accounted for in the shape computation. By creating a multi-core fiber that is helixed and has a central core, the twist of a fiber can be sensed. But the problem is how to obtain an accuracy of rotational position better than 1 degree. For a high accuracy rotational sensor, the position of strain sensors along the length of the fiber must also be known to a high degree of accuracy. Therefore, some way of measuring the rotation rate of the outer cores in the helixed fiber is desirable, which can then be used to correct the calculation of the fiber position.

Third, fiber with multiple cores that is helixed at a sufficient rate and with Bragg gratings (a conventional optical strain gauge) is difficult and expensive to make. It is therefore desirable to provide a method of achieving nanostrain resolutions without Bragg gratings.

Fourth, multi-core fiber is typically not polarization-maintaining, and so polarization effects are preferably considered.

SUMMARY

The technology described below explains how to use the intrinsic properties of optical fiber to enable very accurate shape calculation in light of the above factors and considerations. In essence, the fiber position is determined by interpreting the back reflections of laser light scattered off the glass molecules within the fiber. This measurement can be performed quickly, with a high resolution, and to a high degree of accuracy.

A very accurate measurement method and apparatus are disclosed for measuring position and/or direction using a multi-core fiber. A change in optical length is detected in ones of the cores in the multi-core fiber up to a point on the multi-core fiber. A location and/or a pointing direction are/is determined at the point on the multi-core fiber based on the detected changes in optical length. The pointing direction corresponds to a bend angle of the multi-core fiber at the position along the multi-core fiber determined based on orthonormal strain signals. The accuracy of the determination is better than 0.5% of the optical length of the multi-core fiber up to the point on the multi-core fiber. In a preferred example embodiment, the determining includes determining a shape of at least a portion of the multi-core fiber based on the detected changes in optical length.

The determination may include calculating a bend angle of the multi-core fiber at any position along the multi-core fiber based on the detected changes in length up to the position. Thereafter, the shape of the multi-core fiber may be determined based on the calculated bend angle. The bend angle may be calculated in two or three dimensions.

Detecting the change in optical length preferably includes detecting an incremental change in optical length in the ones of the cores in the multi-core fiber for each of multiple segment lengths up to a point on the multi-core fiber. The overall detected change in optical length is then based on a combination of the incremental changes. The change in optical length is determined by calculating an optical phase change at each segment length along the multi-core fiber and unwrapping the optical phase change to determine the optical length.

More specifically, in a non-limiting example embodiment, a phase response of a light signal reflected in at least two of the multiple cores from multiple segment lengths may be detected. Strain on the fiber at the segment lengths causes a shift in the phase of the reflected light signal from the segment lengths in the two cores. The phase response is preferably continuously monitored along the optical length of the multi-core fiber for each segment length.

In another non-limiting example embodiment, a reflected Rayleigh scatter pattern in the reflected light signal is detected for each segment length, thereby eliminating the need for Bragg gratings or the like. The reflected Rayleigh scatter pattern is compared with a reference Rayleigh scatter pattern for each segment length. The phase response is determined for each segment length based on the comparison.

A non-limiting example embodiment also determines a twist parameter associated with the multi-core fiber at a point on the multi-core fiber based on the detected changes in optical length of the multi-core fiber. The location at the point on the multi-core fiber is then translated to an orthonormal coordinate system based on the determined twist parameter. Preferably, the determined twist parameter is corrected for each of the segment lengths.

In one example application where the multi-core fiber includes three peripheral cores spaced around a fourth core along the center of the multi-core fiber, a phase response of a light signal reflected in each of the four cores from each segment length is determined Strain on the multi-core fiber at one or more of the segment lengths causes a shift in the phase of the reflected light signal in each core. The phase responses for the three peripheral cores are averaged. The averaged phase response is combined with the phase response of the fourth core to remove a common mode strain. The twist parameter is then determined from the combined phase response.

In another non-limiting example embodiment, bend-induced optical length changes along the multi-core fiber are determined and accounted for when determining the twist parameter. A bend at one of the segment lengths is calculated and squared. The squared bend is multiplied by a constant to produce a bend product which is combined with the determined change in optical length of an outer core of the multi-core fiber at the one segment length. One example beneficial application for this embodiment is for bend radii less than 50 mm.

Another non-limiting example embodiment determines a rotational orientation of the multi-core fiber about its axis at a point on the multi-core fiber at each of the segment lengths. A correction is made for the effect of torsion and the resulting twist on the determined orientation based on the detected changes in optical length of the multiple fiber cores. This correction is required to compute the correct bend direction.

Given a multi-core fiber characterized by a nominal spin rate, another non-limiting example embodiment determines an angular rotation of the multi-core fiber at a point on the multi-core fiber at each of the segment lengths compared to the nominal spin rate of the multi-core fiber. A variation in the nominal spin rate at the point along the multi-core fiber is determined and corrected for. A "wobble factor" is determined for the multi-core fiber by constraining the multi-core fiber to a curved orientation in one plane. Correction is then made for the wobble factor when determining the location at the point on the multi-core fiber based on the detected changes in optical length.

In another non-limiting example embodiment, light is transmitted with at least two polarization states along the multi-core fiber. Reflections of the light with the at least two polarization states are combined and used in determining the location or the pointing direction at the point on the multi-core fiber based on the detected changes in optical length. The two polarization states include a first polarization state and a second polarization state which are at least nominally orthogonal. A polarization controller is used to transmit a first light signal at the first polarization state along the multi-core fiber and to transmit a second light signal at the second polarization state along the multi-core fiber. A polarization-independent change in optical length in each one of multiple cores in the multi-core fiber is calculated up to the point on the multi-core fiber using reflections of the first and second light signals.

DETAILED DESCRIPTION

Figure 1:
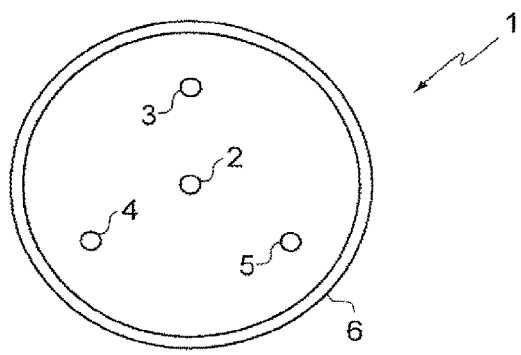
FIG. 1 shows a cross-section of an example multi-core fiber.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Phase Tracking for Increased Angular Accuracy

FIG. 1 shows a cross-section of an example multi-core fiber 1 that includes a center core 2 and three peripheral cores 3, 4, and 5 surrounded by coating 6. These cores 3-5 shown in this example are spaced apart by approximately 120 degrees.

Figure 2:
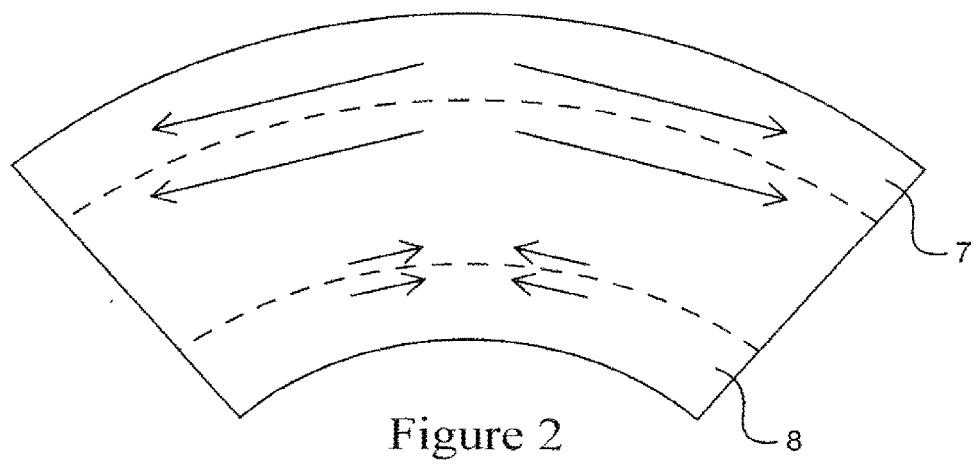
FIG. 2 shows a bent multi-core fiber.

Shape sensing with a multi-core fiber assumes that the distances between cores in the fiber remain constant, when viewed in cross section, regardless of the shape of the fiber. This assumption is often valid because glass is very hard and very elastic. Further, the cross section of the fiber (e.g., ~125 microns) is small when compared with the dimensions of curves experienced by the fiber (e.g., bend radii greater than 5 mm) This maintenance of the cross-sectional position of the cores implies that all deformation of the fiber must be accommodated by the elongation or the compression of the cores. As shown in FIG. 2, when a shape fiber is bent, a core on the outside 7 of the bend will be elongated while a core on the inside 8 of the bend will experience compression.

Since the average length of a fiber core segment is assumed to remain unchanged, an exercise in geometry shows that the change in the pointing direction, (i.e., a vector that describes the position of the central axis of the fiber segment), can be calculated based on the change in the core lengths and the distance between the cores. Other effects, such as the strain-optic coefficient, must be taken into account. The result is that the change in pointing direction for a given segment of fiber is directly proportional to the difference in length changes in the cores within that segment.

Figure 3:
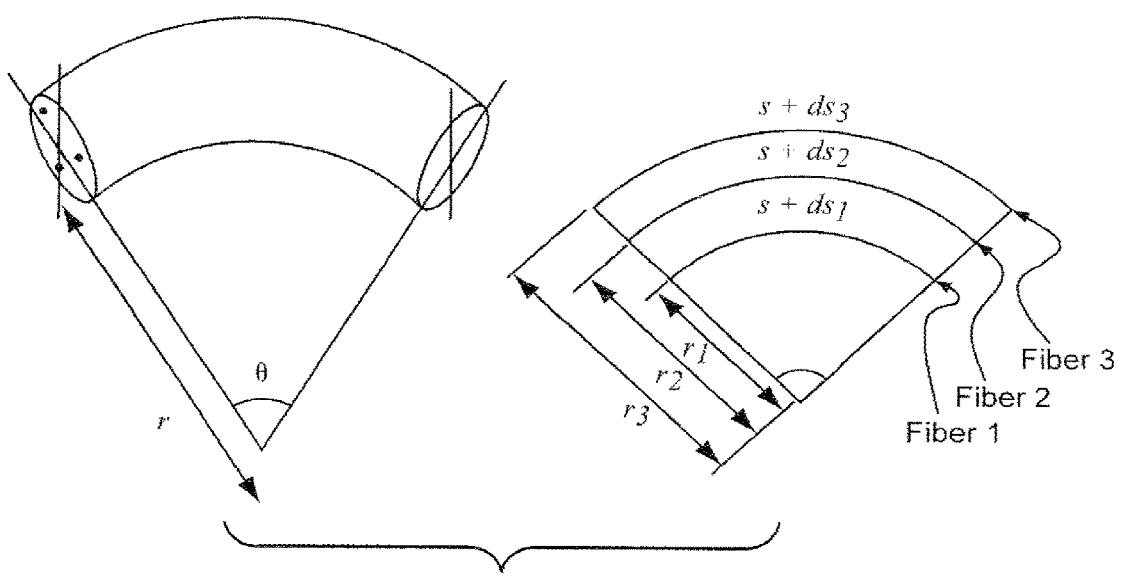
FIG. 3 shows that the bend in the fiber is proportional to the strain in the off-center cores.

FIG. 3 shows that the bend in the fiber θ is proportional to the strain ε in the off-center cores, where s is the segment length, r is radius, and k is a constant. In order to eliminate tension and temperature from the measurement, a differential measurement between the cores is used.

$$\Delta\theta = k\left(\frac{d_{s_2} - d_{s_1}}{s}\right) = k(\varepsilon_2 - \varepsilon_1)$$  Eq. 1

Figure 4:
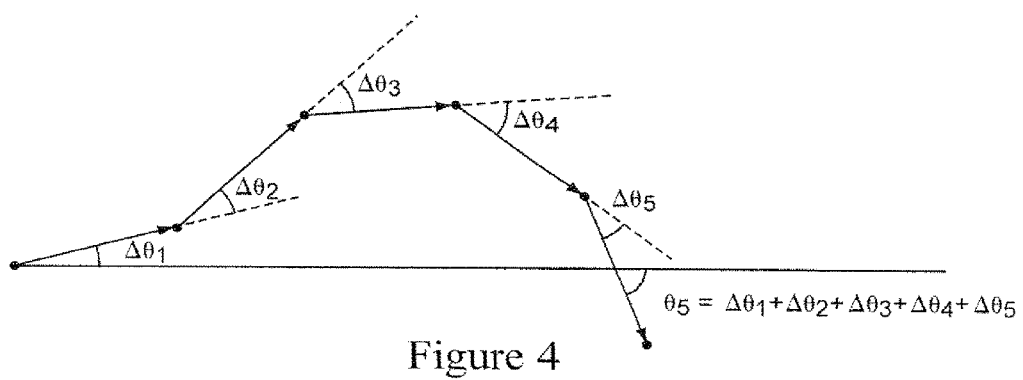
FIG. 4 shows that bend angle at any location along the fiber can be determined by a summation of all previous angles.

The above equation describes the angular change for a given fiber segment and how it relates to a change in strain. Moving to the next segment in the fiber, the angular change of the previous segment must be added to the next change in angle for the next segment to calculate the current pointing direction of the fiber. In two dimensions, all of the previous angles can be accumulated to find the bend angle at any particular location along the fiber. FIG. 4 shows the bend angle at any point or location along the fiber can be determined by a summation of all angles leading up to that point, e.g., $\theta_5 = \theta_1 + \theta_2 + \theta_3 + \theta_4 + \theta_5$. If there are errors in measuring the angles, these errors accumulate along the fiber and result in a total error. This error becomes greater the longer the fiber, growing as the square root of the number of segments.

To avoid this accumulated angle measurement error, the inventors conceived of directly measuring the change in length of a segment rather than measuring strain. Mathematically, the summation of angles then becomes the summation of the length changes along the fiber as shown in equation (2) where L corresponds to fiber length.

$$\theta = \sum \Delta\theta = k \sum \frac{(d_{s_2} - d_{s_1})}{s} = \frac{k(\Delta L_2 - \Delta L_1)}{s}$$  Eq. 2

Thus, the angle at any position Z along the fiber then becomes linearly proportional to the difference between the total changes in length of the cores up to that position as shown in equation (3).

$$\theta(z) \propto \Delta L_2(z) - \Delta L_1(z)$$  Eq. 3

Therefore, if the total length change along the fiber can be accurately tracked continuously, rather than summing each individual local change in strain, the angular error can be prevented from growing. Later, it will be shown how it is possible to track the change in length of a core to an accuracy better than 10 nm, and to maintain this accuracy over the entire length of the fiber. This level of accuracy yields 0.3 degrees of angular accuracy with a 70 micron separation between cores and, theoretically, about 0.5% of fiber length position accuracy.

Unfortunately, the cumulative relationship defined in (3) does not hold in three dimensions. But most three dimensional shapes can be accurately represented as a succession of two dimensional curves, and in the presence of small angular changes (<10 degrees), three dimensional angles also have this simple cumulative relationship. As a consequence, this approach is useful to assess error contributions in three dimensions.

The insight provided by this geometric exercise is that the total length change as a function of distance along the multi-core fiber is used rather than local strain. In other words, relatively larger errors in the measured local strain values can be tolerated as long as the integral of the measured strain corresponding to the total length change up to that point, remains accurate. Nanostrain accuracies are achieved without requiring extremely large signal-to-noise ratios as the distances over which the nanostrains are calculated are relatively large (e.g., many centimeters such as 10-1000 cm). As explained later in description, the tracking of the change in length can also be used to assess rotation along the length of the fiber allowing higher than expected accuracies to be achieved in the measurement of fiber roll, or rotational angle around the fiber's axis, as well.

Phase Tracking in Optical Fiber

As a sensor, optical fiber can provide spatially continuous measurements along its entire length. Continuous measurements are important because optical phase shifts are used to provide very high resolution displacement measurements. Later it is explained how the intrinsic scatter in the fiber can be used to achieve this measurement, but it is conceptually easier to begin the explanation with Fiber Bragg Gratings (FBGs). A Fiber Bragg Grating is a periodic modulation of the index of refraction of the fiber. Each period is about one half of the wavelength of the light in the fiber. The vacuum wavelength of the light is about 1550 nm, and its wavelength in the fiber is about 1000 nm. The period of the grating is therefore about 500 nm. Typically a Bragg grating is used as a sensor by measuring its reflected spectrum. The Bragg grating condition is calculated using the equation below.

$$\lambda_B = 2n\lambda$$  Eq. 4

In this equation, $\lambda_B$ represents wavelength, n is the index of refraction of fiber, and λ corresponds to the period of the grating. If it is assumed that the index of refraction remains constant, then the reflected wavelength is solely dependent on the period of the grating. As the fiber is strained, the period of the grating is distorted, creating a shift in the reflected wavelength. Thus, for a shift in wavelength, it is possible to derive the amount of strain that was applied to the fiber. The period of a Bragg grating is highly uniform, and it is convenient to model this periodicity as a sinusoidal modulation. When represented as a sinusoid, distortions in the period of the grating can be described as phase shifts. To illustrate this concept, consider the example in FIG. 5 which shows that as a fiber containing Bragg gratings is strained, a phase difference measured from a reference state begins to accumulate.

Figure 5:
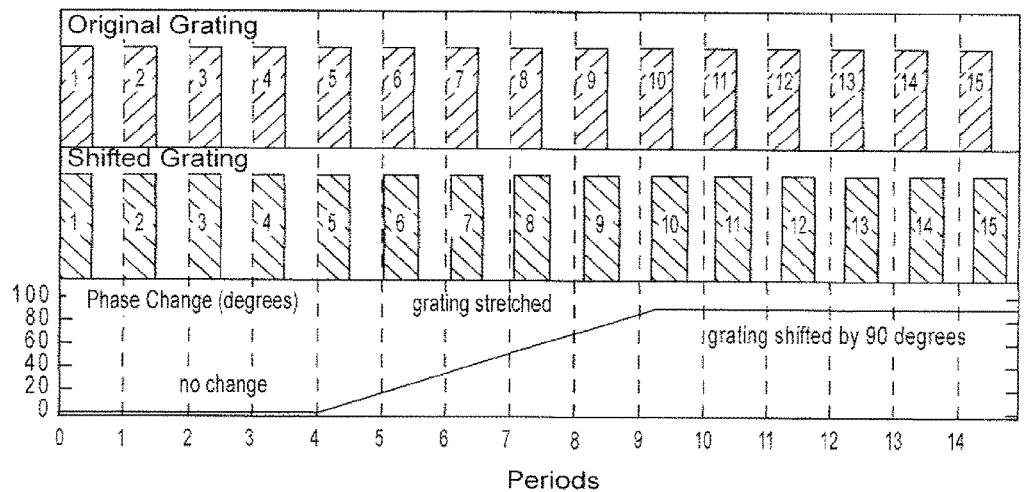
FIG. 5 shows that as a fiber containing Bragg gratings is strained, a phase difference measured from a reference state begins to accumulate.

The depiction of a strained Bragg grating shown in FIG. 5 illustrates the local changes in index of refraction as alternating white and hatched segments. Assuming an ideal Bragg grating, all of the periods are identical, and the phase of the modulation pattern increases linearly moving along the grating. In other words, the rate of change of the phase with distance is inversely proportional to the period of the grating. If a small portion of the grating is stretched, then the rate of change of the phase decreases in the stretched portion.

In FIG. 5, the top pattern depicts an undistorted grating with a perfectly linear phase as a function of position. The lower shifted pattern depicts a grating distorted due to strain. The bottom graph shows the difference in phase between the two gratings at each location. The distortion in the grating results in a phase shift in the reflected signal of the grating with respect to the original undistorted phase. A phase shift of 90 degrees is illustrated. After the strained segment, the rate of change returns to the unstrained state. However, the phase in this region is now offset from the original phase by an amount equal to the total phase change in the strained segment. This phase offset is directly proportional to the actual length change of the optical fiber.

This illustration shows only fifteen periods of the grating. Since a period is 500 nm, this amounts to 7.5 um in length. Stretching the fiber to induce a 90 degree phase shift displaced the remaining unstrained gratings by a quarter of a period, or 125 nm. A typical Optical Frequency Domain Reflectometry (OFDR) measurement may have a spatial resolution on the order of 50 microns. In other words, each OFDR data point, or index, is separated by 50 um. So a distortion of 125 nm results in only a small fraction of an OFDR index shift in the actual position of the grating. While the 125 nm change in position is not detectable itself, the 90 degree phase shift is relatively easily measured with an OFDR system.

OFDR can therefore be used to measure distortions within Bragg gratings, and instead of only measuring the rate-of-change of the phase (i.e., wavelength), the absolute phase can be measured, and from the phase, distance changes at each segment along the fiber core. This is important for accurate shape measurements in a situation where the phase in the grating is observed to have changed, while the position of the grating shows no readily discernable change. Conventional optical fiber measurement technologies treat the phase shift and the position as separate effects.

Figure 6:
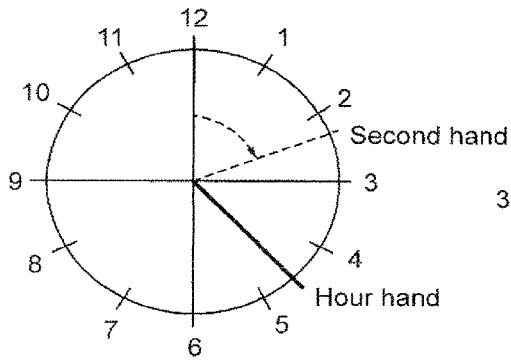
FIG. 6 shows a clock that helps to visualize the relationship between the phase shift and position.

One way to visualize the relationship between the phase shift and position is to imagine that the phase of the optical signal is represented by the second hand on a clock, and that the location along the fiber in index is represented by the hour hand on a clock. FIG. 6 illustrates a clock with no minute hand. Such a clock makes it difficult to determine the time to a resolution of one minute. But this clock is still useful for timing both short duration events with the second hand and long duration events with the hour hand. Lacking a minute hand, it is not useful for measuring intermediate midscale duration events (e.g., 1 hour 12 minutes and 32 seconds) to one second precision. This difficulty of linking the two scales has caused conventional optical measurement systems to treat the phenomena separately.

This clock analogy helps to clarify why a continuous measurement is needed along the entire length of the fiber. By monitoring the position of the second hand continuously, the number of complete revolutions can be measured, which allows the simultaneous monitoring of long durations to a high precision. Linking the clock analogy to the previous discussion of Bragg gratings, each 360 degrees, or $2\pi$, of phase change equates to a 500 nm shift in location. By continuously tracking phase along the optical fiber, both local strains and overall length changes of the optical fiber can be measured to a very high precision.

Figure 7:
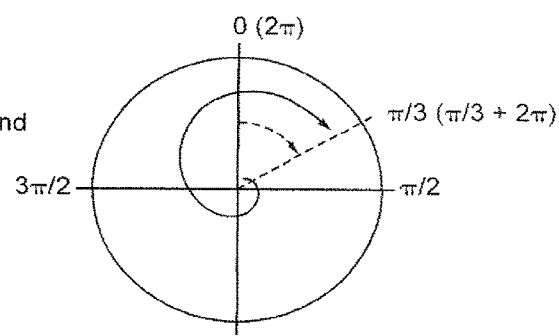
FIG. 7 illustrates how a lack of resolution in measuring phase can be problematic.

A challenge in tracking the phase continuously is that the resolution of the measurement must be sufficient such that the phase does not change from one segment to the next by more than $2\pi$. FIG. 7 illustrates how this lack of resolution can be problematic because there is no way to distinguish, for example, between a change of $\pi/3$ and a change of $\pi/3+2\pi$. So two different phase shifts will appear to have the same value on the unit circle. In other words, an error of one index would be incurred in a count of full $2\pi$ revolutions. In this example, measurement of the overall change in length of the optical fiber would be deficient by 500 nm.

So it is it is important that a shape sensing system has sufficient resolution to guarantee the ability to track phase along the entire length of a shape sensing fiber to ensure the accuracy of a shape sensing system.

Rayleigh Scatter-Based Measurements

As explained above, the typical use of an FBG for sensing involves measuring shifts in the reflected spectrum of individual Bragg gratings spaced at some interval down a fiber. Strain is derived for each section of fiber from the measurement for each Bragg grating. For shape sensing using FBGs, each strain measurement indicates how much a given segment is bent and in which direction. This information is summed for all measured segments to give the total fiber position and/or shape. However, using this method, an error in each segment accumulates along the fiber. The longer the fiber, the larger the error in the measurement. This error using multiple Bragg gratings limits the speed of operation and the range of applications.

If there were a continuous grating along the fiber, then the phase could be tracked at every point along the fiber as described above. Tracking the phase along the entire length of the core avoids accumulating error. Instead of accumulating error as the square root of the number of fiber segments, the total length error remains constant at a fraction of the optical wavelength in the material. As mentioned earlier, a wavelength of light can be about 1550 nm in a vacuum and about 1000 nm in the fiber, which is effectively 500 nm in reflection. A signal-to-noise ratio of 50 provides for an accuracy of 10 nm due to the round trip (reflective) nature of the measurement. The resulting strain accuracy over one meter of fiber will be 10 nanostrain.

Rayleigh scatter can be viewed as a Bragg grating with random phases and amplitudes or a Bragg grating consisting entirely of defects. This Rayleigh scatter pattern, while random, is fixed within a fiber core when that core is manufactured. Strain applied to an optical fiber causes shifts or distortions in the Rayleigh scatter pattern. These induced distortions of the Rayleigh scatter pattern can be used as a high resolution strain measurement for shape sensing by comparing a reference scan of the fiber when the fiber is in a known shape with a new scan of the fiber when it has been bent or strained.

Figure 8:
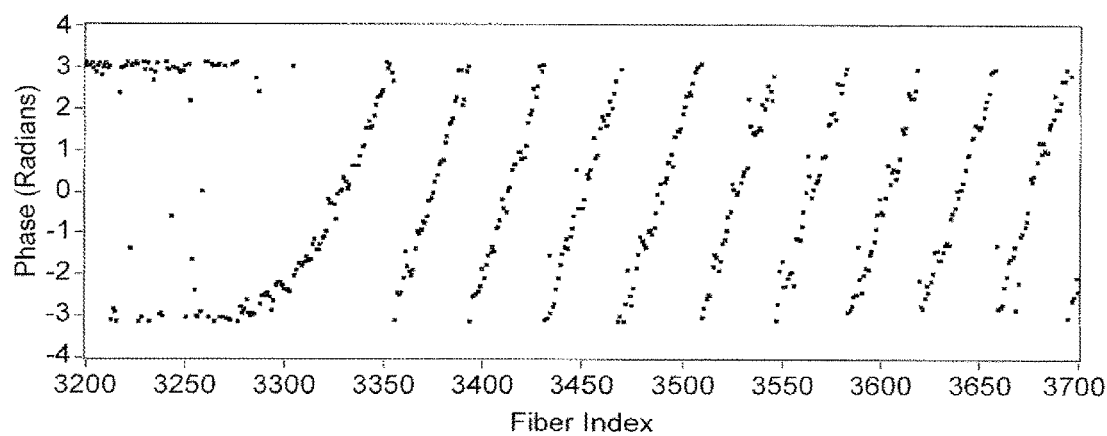
FIG. 8 is a graph that shows a phase difference of a Rayleigh scatter signal between a reference scan and a measurement scan at the beginning of a section of fiber that is under tension.

FIG. 8 shows example results of such a comparison. This figure shows the phase difference of the Rayleigh scatter signal between a reference scan and a measurement scan at the beginning of a section of fiber that enters a region that is under tension. The data is plotted as a function of fiber index, which represents distance along the fiber. Once the region of tension is entered, the phase difference begins to accumulate. Since $\pi$ and $-\pi$ have the same value on the unit circle, the signal experiences "wrapping" every multiple of $2\pi$ as the phase difference grows along the length of the fiber. This can be seen around index 3350 where the values to the left of this are approaching $\pi$, and then suddenly the values are at $-\pi$. As shown, each wrap represents about 500 nm of length change in the fiber. Since an index represents about 50 microns of length, it takes about one hundred wraps of the phase to accumulate a full index of delay change between measurement and reference.

Figure 9:
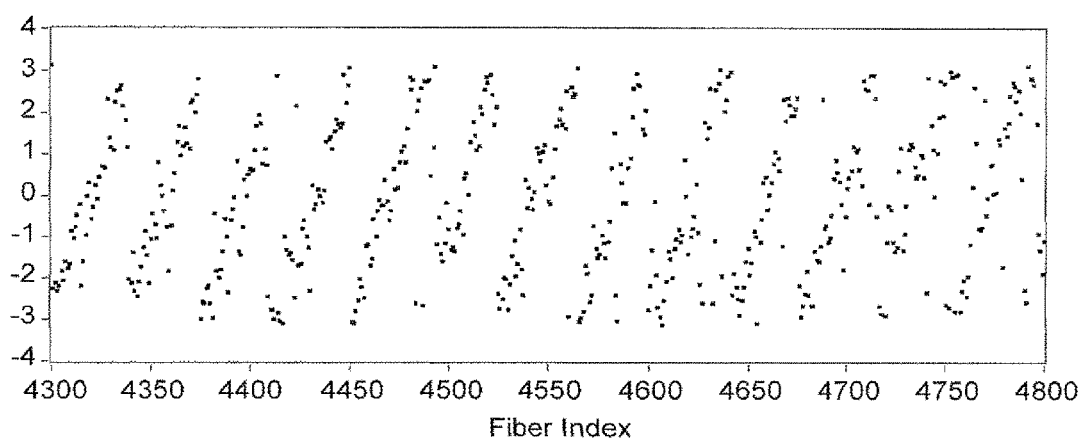
FIG. 9 is a graph that shows that coherence is lost with the reference measurement at a greater distance down a fiber under tension.

The data in FIG. 9 is from the same data set as that for FIG. 8, but from an area further down the fiber after about 35 wraps of the phase, or, roughly one third of an index. The noise on the phase difference data has increased and is caused by the increasing shift between the reference and measurement scatter patterns. This decreases the coherence between the reference and measurement data used to determine the phase difference. If the apparent location of an individual scattering fiber segment shifts by more than an index, then the coherence between the reference and the measurement is lost, and no strain measurement can be obtained from the comparison of scatter signals.

Therefore, the reference data should be matched to the measurement data by accounting for the shifting due to strain along the fiber. In the case of one index being about 50 microns, over a one meter segment, this amounts to only 50 parts per million, which is not a large strain. In fact, the weight of the fiber itself can induce strains on this order. Also, a change in temperature of only a few degrees Celsius can induce a similar shift. Therefore, this shift in index should be accounted for in the calculation of the distortion of the core.

A shift as a result of tension is a physical expansion of the individual segments which results in an increased time of flight of the scattered light. The shift between reference and measurement is referred to as delay. The delay can be accounted for by looking at a model of how a shift in the delay to any point in the sensing core affects the signal reflected from this point. If a field (light) is oscillating at a frequency, $\nu$, and it undergoes a delay of $\tau$, then the optical phase as a function of delay is given by, $$\phi = 2\pi\tau\nu \qquad \text{Eq. 5}$$

Figure 10:
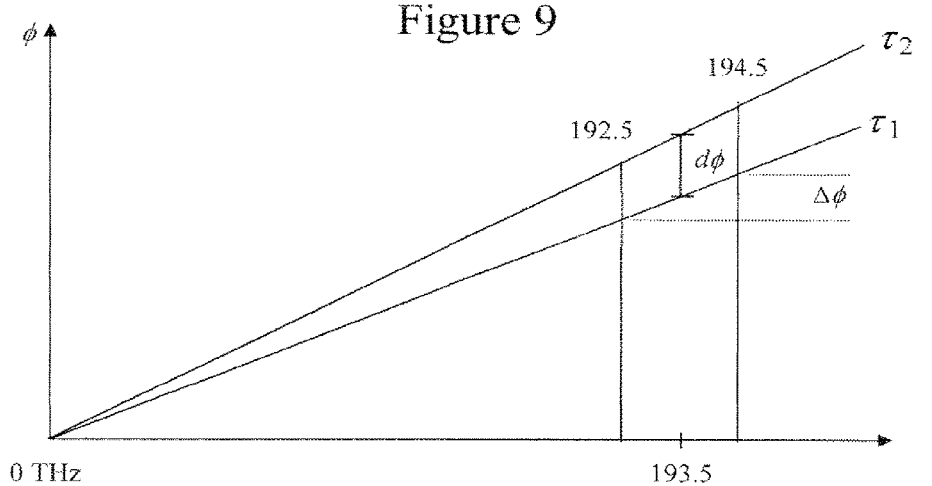
FIG. 10 shows optical phase plotted against frequency for two different delays.

If the optical phase, $\phi$, is plotted as a function of frequency, $\nu$, a straight line is obtained that intersects the origin. In practice, passing through a material such as glass distorts this curve from a perfect line, which should be kept in mind when comparing measured values to the values predicted by this model. But for immediate purposes, this model is sufficient. FIG. 10 shows this phase for two different delays. In an example, non-limiting measurement system using the principle described above, a typical sweep of the laser might cover a range of 192.5 to 194.5 THz. These frequencies represent a sweep from 1542 nm (194.5 THz) to 1558 nm (192.5 THz), which has been a test sweep range for a non-limiting, test shape sensing application. Over this range of interest, the phase for a given delay sweeps over a range of $\Delta\phi$. For the two delays shown, $\tau_1$ and $\tau_2$, the difference in this sweep range, $\Delta\phi_2 - \Delta\phi_1$, is less than the change in phase at the center frequency, (193.5 THz), labeled $d\phi$. The factor between the change in phase at the center frequency and the change in phase sweep range will be the ratio of the center frequency to the frequency sweep range. In this example case, the ratio is 96.7.

In the example test application, the sweep range, $\Delta\nu$, determines the spatial resolution, $\delta\tau$, of the measurement. In other words, it determines the length of an index in the time domain. These are related by an inverse relationship:

$$\delta\tau = 1/(\Delta\nu) \qquad \text{Eq. 6}$$

For the example frequency range described above, the length of an index is 0.5 ps, or 50 microns in glass. At the center frequency, a phase shift of $2\pi$ is induced by a change in delay of only 0.00516 ps, or 516 nm in glass. A phase shift of $2\pi$, then, represents only a fractional index shift in the time domain data. In order to shift the delay by one index in the time domain, the delay must change enough to induce a phase change at the center frequency of $96.7 \times 2\pi$.

These examples illustrate that a linear phase change represents a shift in the location of events in the time, or delay, domain. As seen above, a shift of one index will completely distort the measurements of phase change along the length of the fiber. To properly compare the phases, then, these shifts should be accounted for as they happen, and the reference data should be aligned with the measurement data down the entire length of the core. To correct for this degradation of coherence, a temporal shift of the reference data is required. This may be accomplished by multiplying the reference data for a given segment, $r_n$, by a linear phase. Here n represents the index in the time domain, or increasing distance along the fiber. The slope of this phase correction, $\gamma$, is found by performing a linear fit on the previous delay values. The phase offset in this correction term, $\phi$, is selected such that the average value of this phase is zero.

$$\tilde{r}_n = r_n e^{i(\gamma n + \phi)} \qquad \text{Eq. 7}$$

Figure 11:
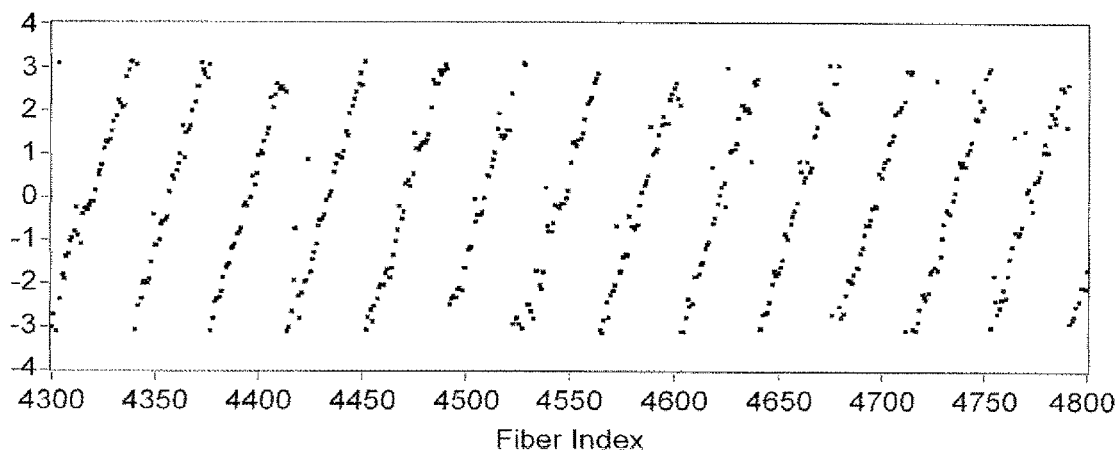
FIG. 11 shows a recovered phase over a section of fiber where a third of an index shift has occurred.

FIG. 11 shows the corrected phase difference over a section of fiber where a third of an index shift has occurred. The phase difference at this location maintains the same signal-to-noise ratio as the closer part of the fiber. By applying a temporal shift based on the delay at a particular distance, coherence can be recovered reducing phase noise.

Example Shape Sensing Fiber

Tracking distortions in the Rayleigh scatter of optical fiber provides high resolution, continuous measurements of strain. The geometry of the multi-core shape sensing fiber is used to explain how this multi-core structure enables measurements of both bend and bend direction along the length of the fiber.

Figure 12:
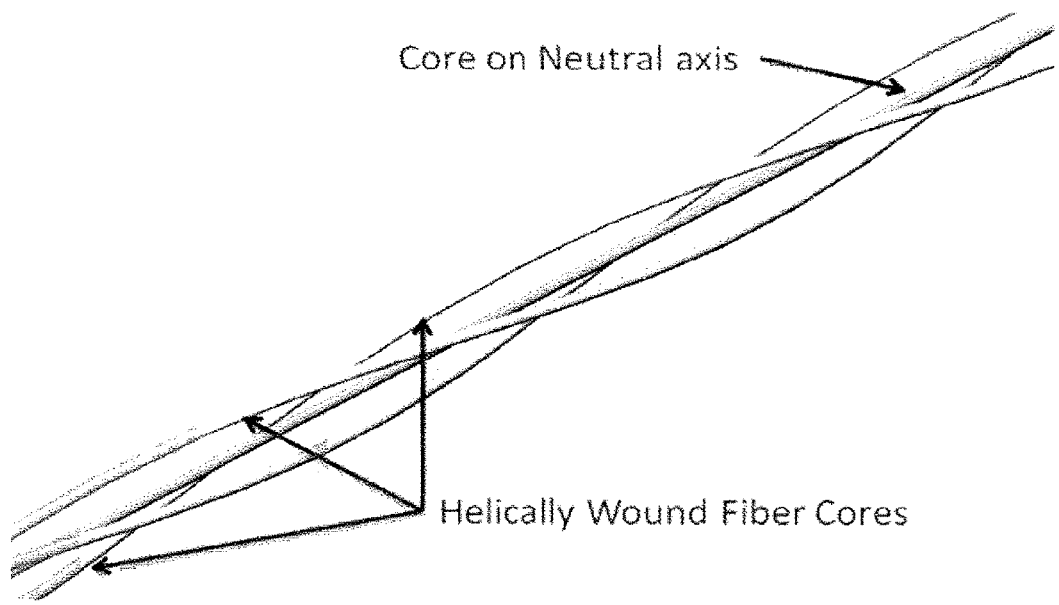
FIG. 12 illustrates an example of helically-spun multi-core shape sensing fiber.
Figure 13:
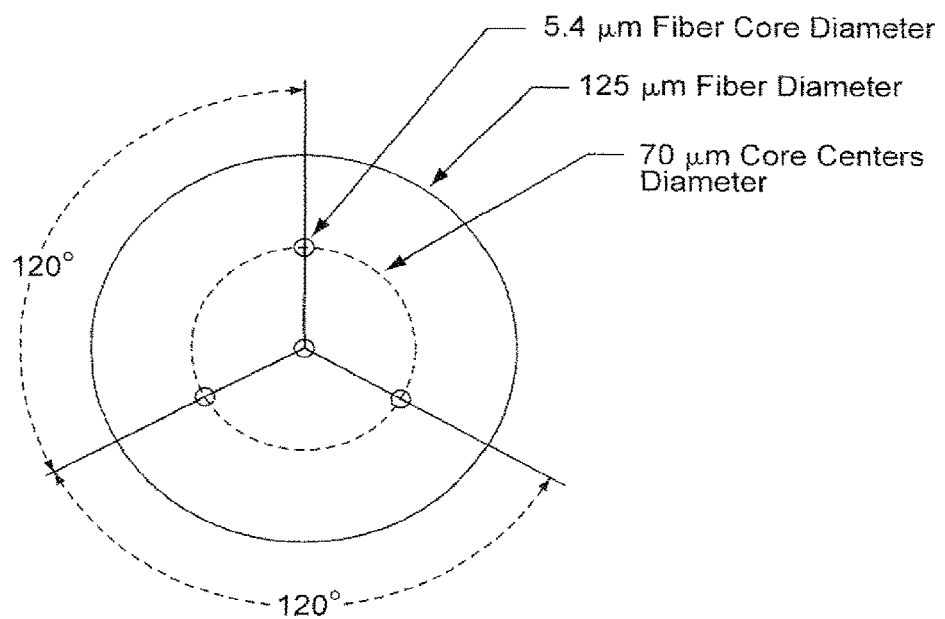
FIG. 13 illustrates a non-limiting, example test multi-core optical fiber.

The optical fiber contains multiple cores in a configuration that allows the sensing of both an external twist and strain regardless of bend direction. One non-limiting, example embodiment of such a fiber is shown in FIG. 1 and described below. The fiber contains four cores. One core is positioned along the center axis of the fiber. The three outer cores are placed concentric to this core at 120 degree intervals at a separation of 70 um. The outer cores are rotated with respect to the center core creating a helix with a period of 66 turns per meter. An illustration of this helically-wrapped multi-core shape sensing fiber is depicted in FIG. 12. A layout of a non-limiting test multi-core optical fiber used in this discussion is pictured in FIG. 13.

Another non-limiting example of a shape sensing fiber contains more than three outer cores to facilitate manufacture of the fiber or to acquire additional data to improve system performance.

Figure 14:
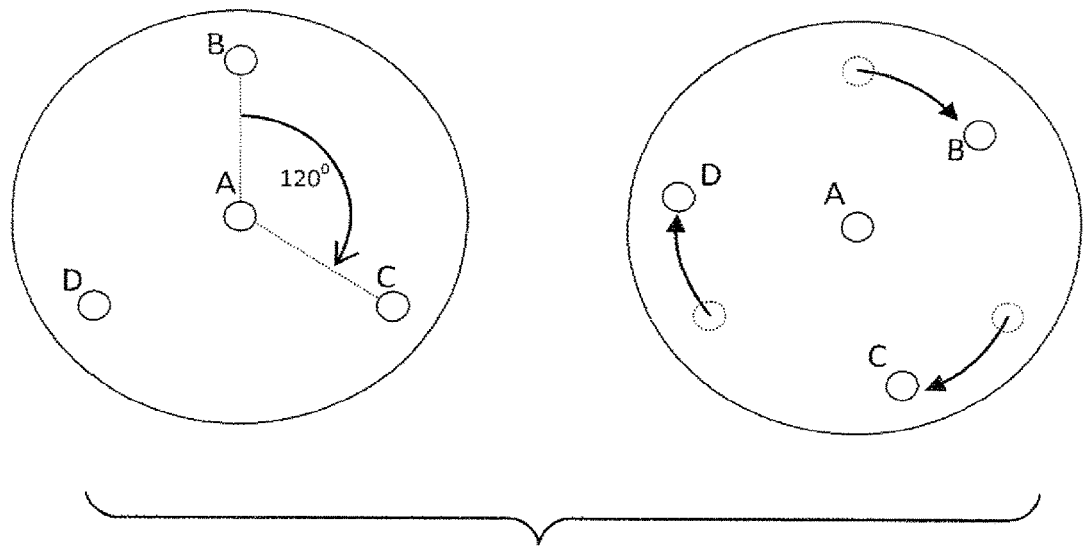
FIG. 14 illustrates a cross-section of a helixed fiber where the position of the outer cores appears to rotate around the center core progressing down the length of the fiber.

In a cross-section of a helixed fiber, the position of each outer core appears to rotate around the center core progressing down the length of the fiber as illustrated in FIG. 14.

Wobble Correction in Twisted Fiber

To translate strain signals from the outer cores in to bend and bend direction, the rotational position of an outer core must be determined with a high degree of accuracy. Assuming a constant spin rate of the helix (see FIG. 12), the position of the outer cores may be determined based on the distance along the fiber. In practice, the manufacture of helixed fiber introduces some variation in the intended spin rate. The variation in spin rate along the length of the fiber causes an angular departure from the linear variation expected from the nominal spin rate, and this angular departure is referred to as a "wobble" and symbolized as a wobble signal W(z).

One example test fiber manufactured with a helical multi-core geometry has a very high degree of accuracy in terms of the average spin rate, 66 turns per meter. However, over short distances (e.g., 30 cm) the spin rate varies significantly, and can cause the angular position to vary as much as 12 degrees from a purely linear phase change with distance. This error in the spin rate is measured by placing the fiber in a configuration that will cause a continuous bend in a single plane, as is the case for a coiled fiber on a flat surface. When the fiber is placed in such a coil, a helical core will alternate between tension and compression as it travels through the outside portion of a bend and the inside portion of a bend. If phase distortion is plotted verse distance, a sinusoidal signal is formed with a period that matches the spin rate of the fiber. Variations in the manufacture of the multi-core fiber can be detected as small shifts in the phase from the expected constant spin rate of the fiber.

Figure 15:
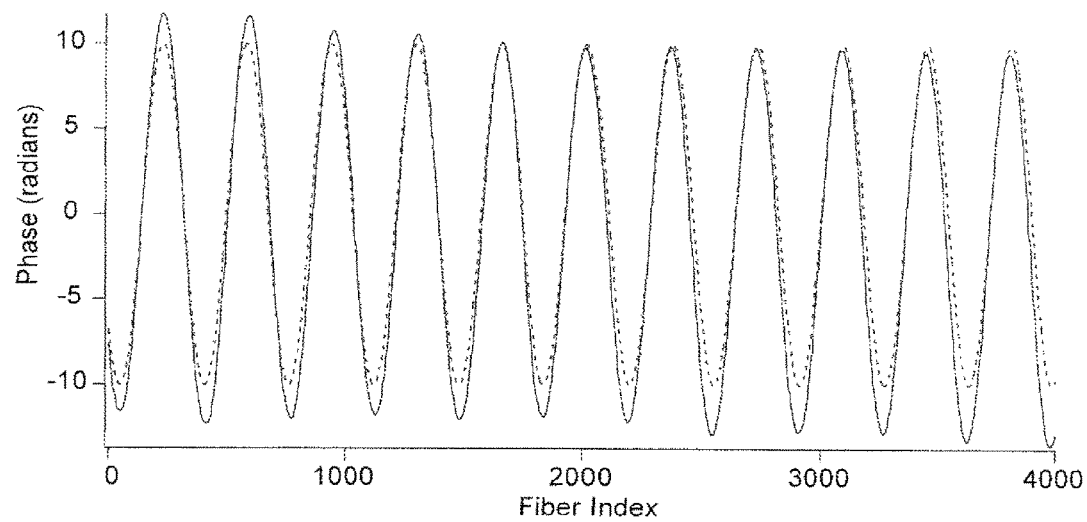
FIG. 15 is a graph that illustrates an example of variations in the spin rate of a fiber.

An example of these variations in the spin rate is shown in FIG. 15. The solid curve is the phase data (bend signal) taken from a planar coil, and the dotted line is a generated perfect sinusoid at the same frequency and phase as the helix. Note that at the beginning of the data segment the curves are in phase with aligned zero crossings. By the middle of the segment, the solid curve has advanced slightly ahead of the dotted curve, but by the end of the data segment, a significant offset is observed. If the DC component of the phase signal is removed, and a phase shift calculated, the difference between these two signals is significant and somewhat periodic.

Figure 16:
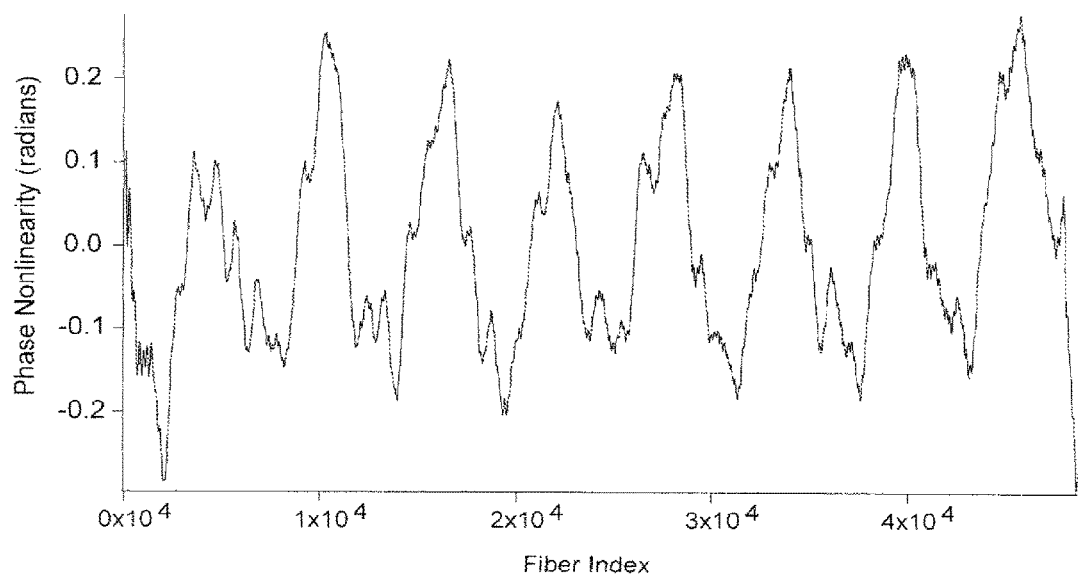
FIG. 16 is a graph that shows an example wobble signal with a periodic phase variation from a manufactured spin rate along the length of a shape sensing fiber.

FIG. 16 shows an example Wobble signal, W(z), with a periodic variation from a manufactured spin rate along the length of a shape sensing fiber. The phase variation is shown as a function of length in fiber index. The example data set represents about three meters of fiber. On the order of a third of a meter, a periodicity in the nature of the spin rate of the fiber is detected. Over the length of the fiber, a consistent average spin rate of the fiber is produced, but these small fluctuations should be calibrated in order to correctly interpret the phase data produced by the multi-core twisted fiber. This measurement in the change in spin rate or "wobble" is reproducible and is important to the calculation of shape given practical manufacture of fiber.

Twist Sensing in Multi-Core Fibers

Torsion forces applied to the fiber also have the potential to induce a rotational shift of the outer cores. To properly map the strain signals of the cores to the correct bend directions, both wobble and applied twist must be measured along the entire length of the shape sensing fiber. The geometry of the helixed multi-core fiber enables direct measurement of twist along the length of the fiber in addition to bend-induced strain as will be described below.

Figure 17:
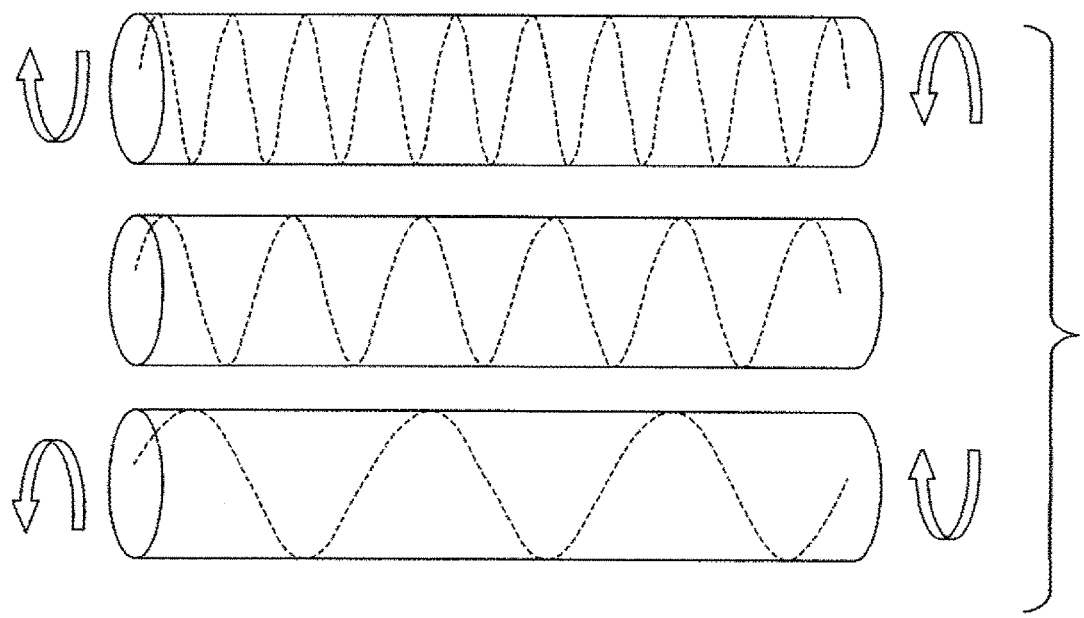
FIG. 17 shows how torsion changes the spin rate of a shape sensing fiber based on orientation of the force to the nominal spin direction of the fiber.

If a multi-core fiber is rotated as it is drawn, the central core is essentially unperturbed, while the outer cores follow a helical path down the fiber as shown in the center of FIG. 17. If such a structure is then subjected to torsional stress, the length of the central core remains constant. However, if the direction of the torsional stress matches the draw of the helix, the period of the helix increases and the outer cores will be uniformly elongated as shown at the top of FIG. 17. Conversely, if the torsional direction is counter to the draw of the helix, the outer cores are "unwound" and experience a compression along their length as shown at the bottom of FIG. 17.

To derive the sensitivity of the multi-core configuration to twist, the change in length that an outer core will experience due to torsion is estimated. A segment of fiber is modeled as a cylinder. The length L of the cylinder corresponds to the segment size, while the distance from the center core to an outer core represents the radius r of the cylinder. The surface of a cylinder can be represented as a rectangle if one slices the cylinder longitudinally and then flattens the surface. The length of the surface equals the segment length L while the width of the surface corresponds to the circumference of the cylinder $2\pi r$. When the fiber is twisted, the end point of fiber moves around the cylinder, while the beginning point remains fixed. Projected on the flattened surface, the twisted core forms a diagonal line that is longer than the length L of the rectangle. This change in length of the outer core is related to the twist in the fiber.

Figure 18:
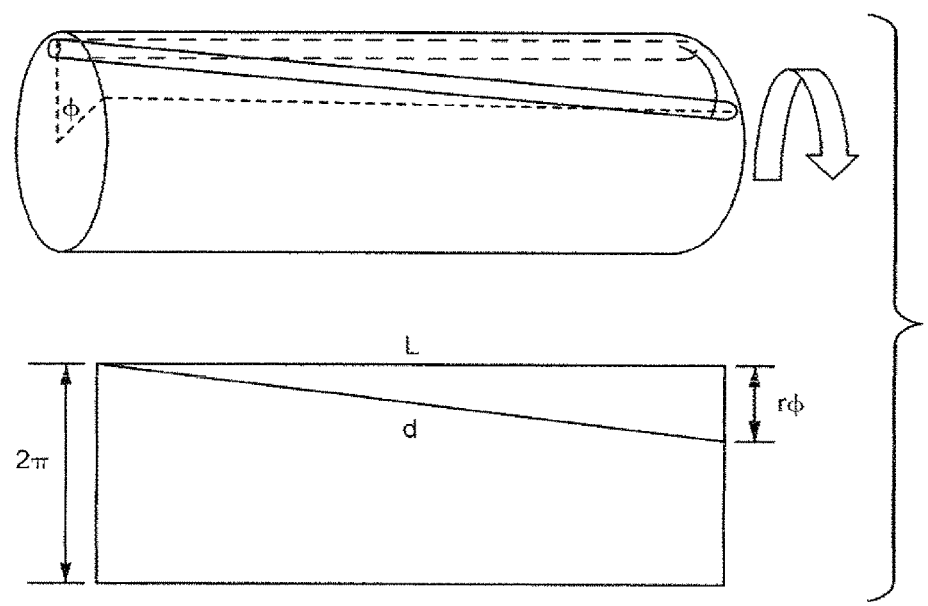
FIG. 18 shows an outer core that experiences twist modeled as a flattened cylinder as it translates along the surface.

FIG. 18 shows an outer core that experiences twist can be modeled as a flattened cylinder as it translates along the surface. From the above flattened surface, the following can be shown:

$$\partial d \approx \frac{2\pi r^2}{L} \partial \phi \qquad \text{Eq. 8}$$

In the above equation, $\partial d$ is the change in length of the outer core due to the change in rotation, $\partial \phi$, of the fiber from its original helixed state. The radial distance between a center core and an outer core is represented by r, and $$\frac{2\pi}{L}$$

is the spin rate of the helical fiber in rotation per unit length.

The minimum detectable distance is assumed in this example to be a tenth of a radian of an optical wave. For the example test system, the operational wavelength is 1550 nm, and the index of the glass is about 1.47, resulting in a minimum detectable distance of approximately 10 nm. If the radius is 70 microns and the period of the helix is 15 mm, then equation (8) indicates that the shape sensing fiber has a twist sensitivity of 0.3 deg. If the sensing fiber begins its shape by immediately turning 90 degrees, so that the error due to twist were maximized, then the resulting position error will be 0.5% of the fiber length. In most applications, 90 degree bends do not occur at the beginning of the fiber, and therefore, the error will be less than 0.5%.

Calculating Twist in a Four Core Fiber

The sensitivity of the twist measurement is based on the sensitivity of a single core, but the sensing of twist along the length of the fiber is dependent on all four cores. If the difference in the change in the length between the average of the outer cores and the center core is known, then the twist (in terms of the absolute number of degrees) present in the fiber can be calculated.

Figure 19:
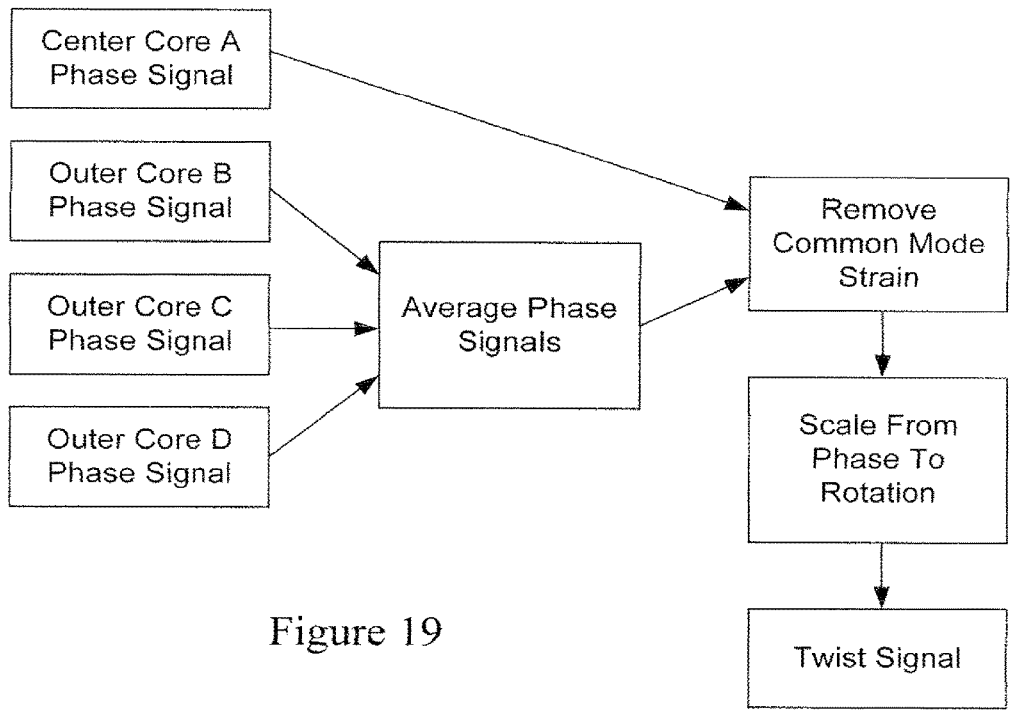
FIG. 19 is a flowchart illustrating non-limiting example procedures to calculate external twist along the fiber.

The external twist along the fiber may be calculated using non-limiting, example procedures outlined in the flow chart shown in FIG. 19. The phase signals for all four cores A-D are determined, and the signals for outer cores B-D are averaged. The calculation of extrinsic twist is performed by comparing the average of the outer core phase signals to that of the center core. If the fiber experiences a torsional force, all outer cores experience a similar elongation or compression determined by the orientation of the force to the spin direction of the helix. The center core does not experience a change in length as a result of an applied torsional force. However, the center core is susceptible to tension and temperature changes and serves as a way of directly measuring common strain modes. Hence, if the center core phase signal is subtracted or removed from the average of the three outer cores, a measure of phase change as a result of torsion is obtained. This phase change can be scaled to a measure of extrinsic twist, or in other words, fiber rotation. Within the region of an applied twist over the length of the fiber less than a full rotation, this scale factor can be approximated as linear. In the presence of high torsional forces, a second order term should preferably be considered. Further, twist distributes linearly between bonding points such that various regions of twist can be observed along the length of the fiber.

Figure 20:
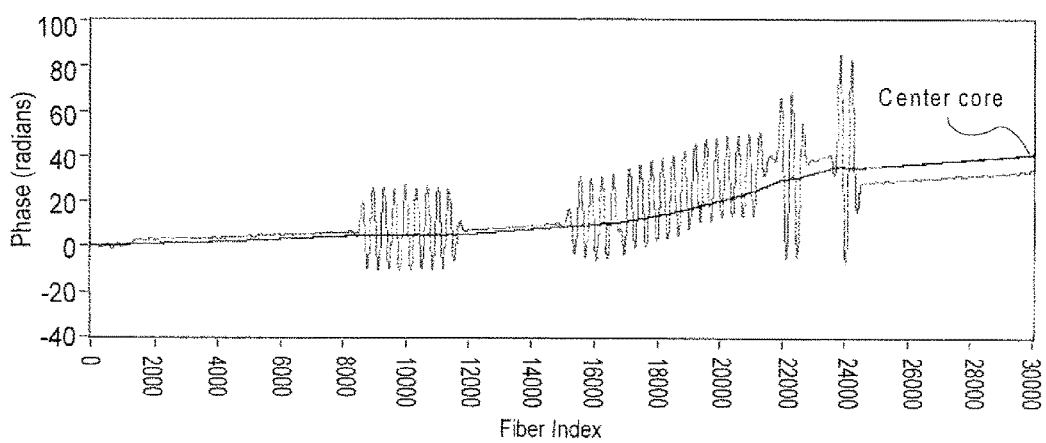
FIG. 20 shows an example data set for a generic shape that illustrates the FIG. 19 procedures in more detail.

FIG. 20 shows an example data set for a generic shape that illustrates the FIG. 19 algorithm in more detail. The graph shows phase distortion as a result of local change in length of the center core (black) and an outer core (gray) of a shape sensing fiber for a general bend. The two phase curves shown in FIG. 20 represent the local changes in length experience by two of the cores in the multi-core shape sensing fiber. The curves for two of the outer cores are not shown in an effort to keep the graphs clear, but the values from these other two cores are used in determining the final shape of the fiber.

The center core phase signal does not experience periodic oscillations. The oscillations are a result of an outer core transitioning between compressive and tensile modes as the helix propagates through a given bend. The central core accumulates phase along the length of the shape sensing fiber even though it is not susceptible to bend or twist induced strain. The center core phase signal describes common mode strain experienced by all cores of the fiber. The outer cores are averaged (gray) and plotted against the center core (black) in FIG. 21.

Figure 21:
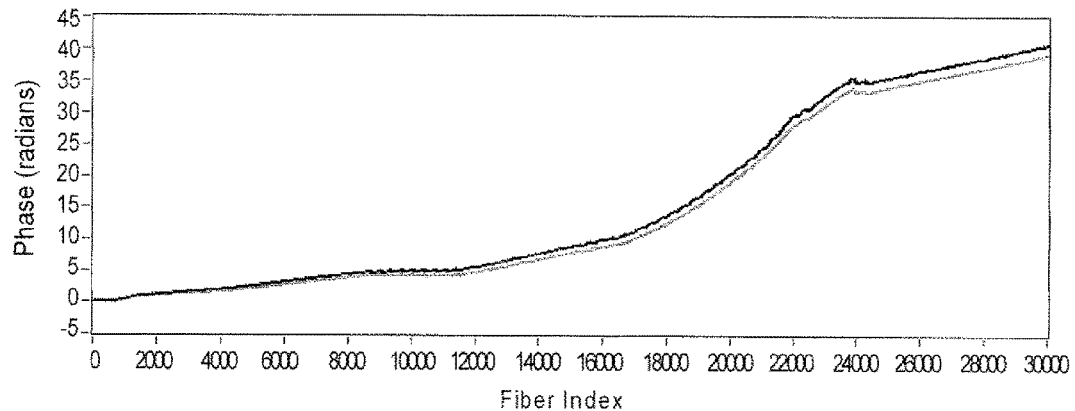
FIG. 21 is a graph that shows a slight deviation between the two phase curves.
Figure 22:
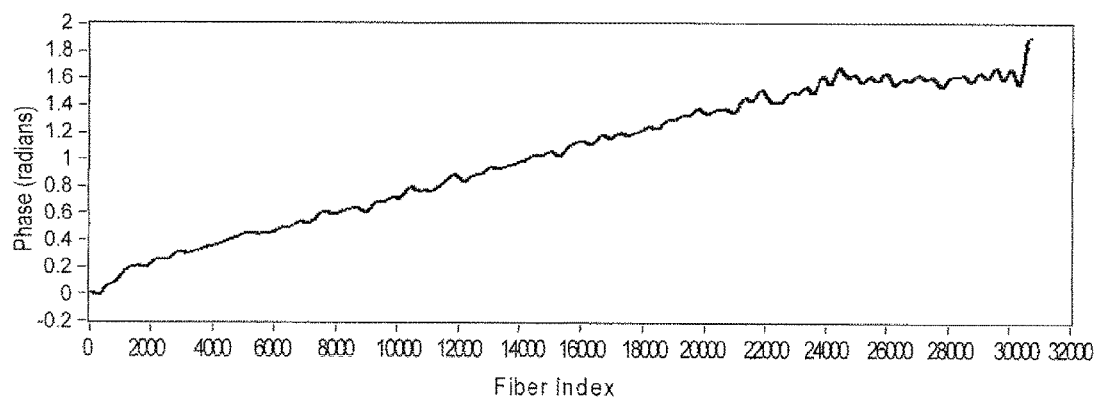
FIG. 22 is a graph illustrating a twist signal produced from FIG. 21.

As the outer cores are 120 degrees out of phase, the bend induced variation in the phase signals averages to zero. FIG. 21, a slight deviation between the two phase curves is observed. Subtracting the center core phase, a direct measure of common mode strain, leaves the phase accumulated as a result of torsional forces. With proper scaling, this signal can be scaled to a measure of fiber roll designated as the "twist" signal T(z) produced from FIG. 21 which is shown in FIG. 22. From the twist signal, T(z), the shift in rotational position of the outer cores as a result of torsion along the length of the shape sensing fiber tether can be determined. This allows a bend signal to be mapped to the correct bend direction.

Figure 23:
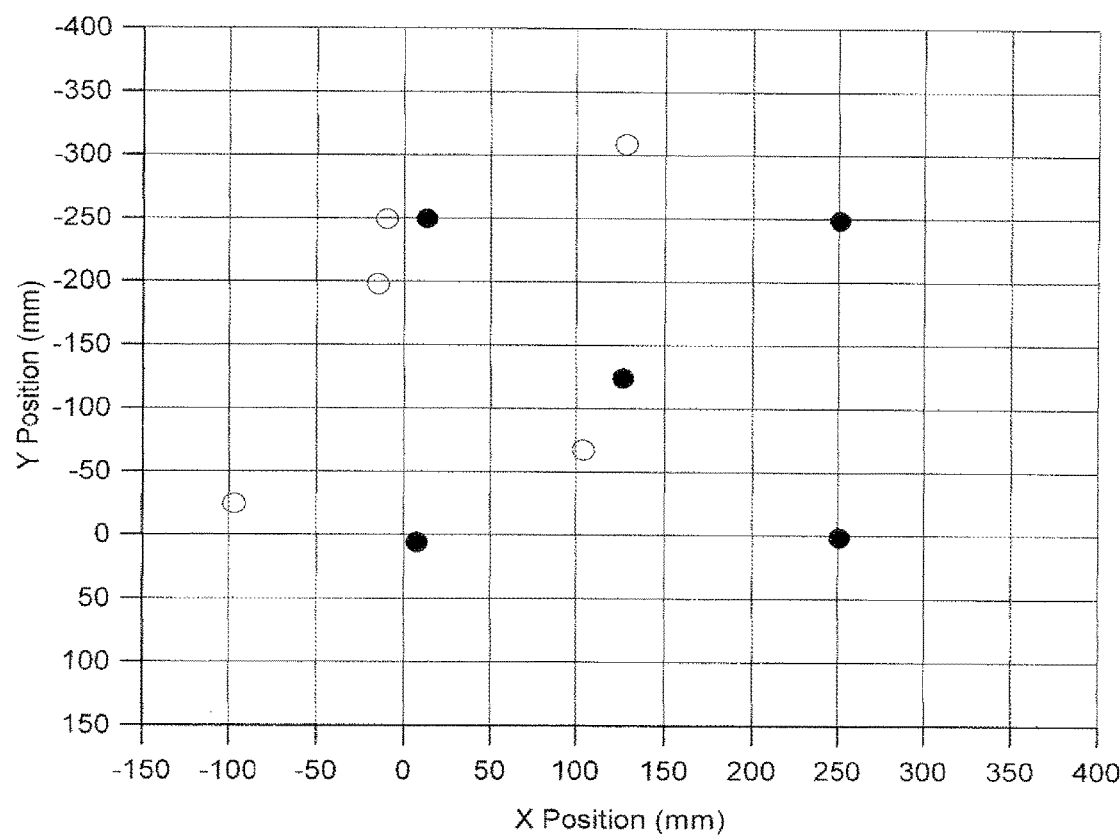
FIG. 23 illustrates the necessity of compensating for twist in the shape calculation.

The desirability of compensating for twist in the shape calculation is illustrated by the data set shown in FIG. 23. The tip of the shape sensing fiber was translated in a single plane through a five point grid forming a 250 mm square with a point at its center with shape processing considering twist (filled). The correction for external twist was not used in the processing of the data set plotted as unfilled dots. In the plot, it is impossible to distinguish the original shape traced with the tip of the fiber if the twist calculation is not used. Even for small fiber tip translations, significant twist is accumulated along the length of the fiber. Thus, if this twist is not accommodated for in the shape sensing, then significant levels of accuracy cannot be achieved.

Calculation of Bend Induced Strain

Along with information describing the amount of twist applied to the shape sensing fiber, a multi-core fiber also enables extraction of bend information in an ortho-normal coordinate system. The phase signals for four optical cores of the shape sensing fiber can be interpreted to provide two orthogonal differential strain measurements as described below. These strain values can then be used to track a pointing vector along the length of the fiber, ultimately providing a measure of fiber position and/or shape.

With the common mode strain removed, the three, corrected, outer core phase signals are used to extract a measure of bend along the shape sensing fiber. Due to symmetry, two of the outer cores can be used to reconstruct the strain signals along the length of the fiber. First, the derivative of the phase signal for two of the outer cores is taken. This derivative is preferably calculated so that the error on the integral of the derivative is not allowed to grow, which translates to a loss of accuracy of the system. For double-precision operations, this is not a concern. But if the operations are done with a limited numeric precision, then rounding must be applied such that the value of the integral does not accumulate error (convergent rounding).

Assume for this explanation that strain can be projected in a linear fashion. Thus, the phase response of a given core is a combination of two orthogonal strains projected against their radial separation.

$$\frac{d\phi_n}{dz} = b_y(z)\sin(kz + \Delta_n) + b_x(z)\cos(kz + \Delta_n) \quad \text{Eq. 9}$$

In the above equation, $b_x$ and $b_y$ are the orthogonal strain signals used to calculate bend. The phase, $\phi_n$, represents the phase response of a core, z is the axial distance along the fiber, k is the spin rate of the helix, and the delta $\Delta$ represents the radial position of the core (120 degree separation).

The phase response from two of the outer cores is:

$$\frac{d\phi_1}{dz} = b_y(z)\sin(kz + \Delta_1) + b_x(z)\cos(kz + \Delta_1) \quad \text{Eq. 10}$$

$$\frac{d\phi_2}{dz} = b_y(z)\sin(kz + \Delta_2) + b_x(z)\cos(kz + \Delta_2) \quad \text{Eq. 11}$$

Solving for $b_x$ and $b_y$:

$$b_y(z) = \frac{1}{\sin(\Delta_1 - \Delta_2)}\left[\frac{d\phi_1}{dz}\cos(kz + \Delta_2) + \frac{d\phi_2}{dz}\cos(kz + \Delta_1)\right] \quad \text{Eq. 12}$$

$$b_x(z) = \frac{1}{\sin(\Delta_2 - \Delta_1)}\left[\frac{d\phi_1}{dz}\sin(kz + \Delta_2) + \frac{d\phi_2}{dz}\sin(kz + \Delta_2)\right] \quad \text{Eq. 13}$$

In the above equations 12 and 13, k, the spin rate, is assumed constant along the length of the fiber. The above derivation remains valid if correction terms are added to the spin rate. Specifically, the measured wobble W(z) and twist signals T(z) are included to compensate for the rotational variation of the outer cores along the length of the fiber. The above expressions (12) and (13) then become the following:

$$b_y(z) = \frac{1}{\sin(\Delta_1 - \Delta_2)}\left[\begin{array}{l}\frac{d\phi_1}{dz}\cos(kz + T(z) + W(z) + \Delta_2) + \\ \frac{d\phi_2}{dz}\cos(kz + T(z) + W(z) + \Delta_1)\end{array}\right] \quad \text{Eq. 14}$$

$$b_x(z) = \frac{1}{\sin(\Delta_1 - \Delta_2)}\left[\begin{array}{l}\frac{d\phi_1}{dz}\sin(kz + T(z) + W(z) + \Delta_2) + \\ \frac{d\phi_2}{dz}\sin(kz + T(z) + W(z) + \Delta_1)\end{array}\right] \quad \text{Eq. 15}$$

Calculation of Shape from Orthogonal Differential Strain Signals

Figure 24:
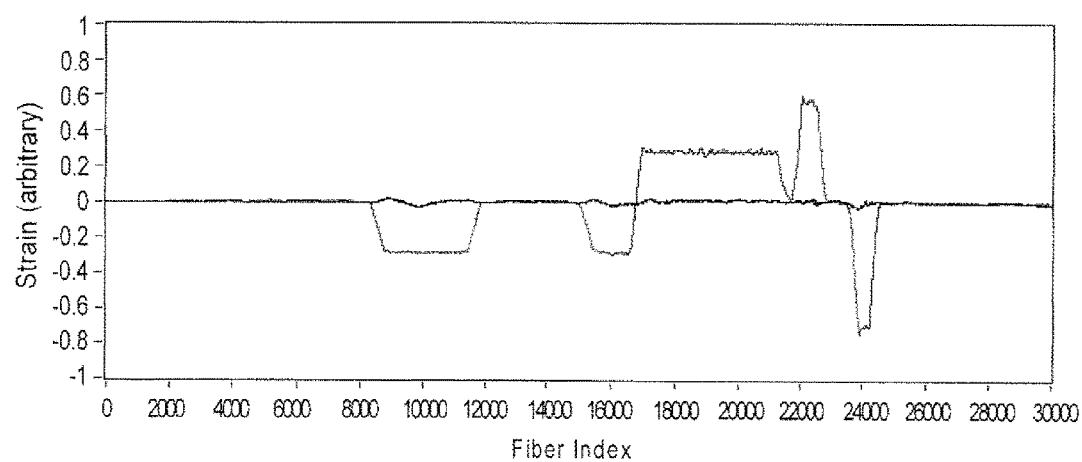
FIG. 24 depicts example orthogonal strain curves for a fiber placed in several bends that all occur in the same plane.

Equations (14) and (15) produce two differential, orthogonal strain signals. FIG. 24 depicts the orthogonal strain curves for a fiber placed in several bends that all occur in the same plane. These two differential, orthogonal strain signals are processed to perform the final integration along the length of the shape sensing fiber to produce three Cartesian signals representing the position and/or shape of the fiber.

Figure 25:
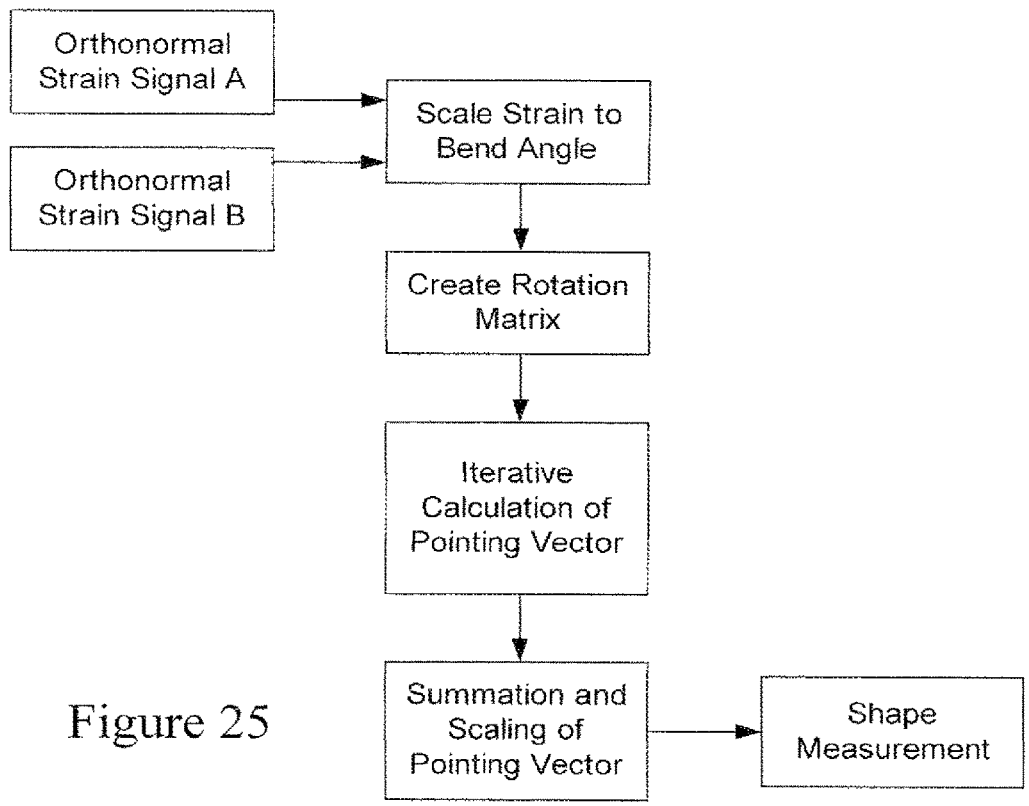
FIG. 25 shows a flowchart diagram describing non-limiting, example steps for calculating shape from strain.

FIG. 25 shows a flowchart diagram describing non-limiting, example steps for calculating shape from strain. Orthonormal strain signals A and B are determined according to the equations 14 and 15.

The acquired data at the data acquisition network is preferably stored in discrete arrays in computer memory. To do this, a change in representation from the continuous representation in equation 15 to a discrete representation based on index is needed at this point. Further, the bend at each point in the array can be converted to an angular rotation since the length of the segment ($\Delta z$) is fixed and finite using equation (1). The parameter, a, is determined by the distance of the cores from the center of the fiber and the strain-optic coefficient which is a proportionality constant relating strain to change in optical path length.

$$\theta_{y,n} = ab_{y,n}\Delta z \qquad \text{Eq. 16}$$

$$\theta_{x,n} = ab_{x,n}\Delta z \qquad \text{Eq. 17}$$

These measures of rotation $\theta$ due to local bend in the fiber can be used to form a rotation matrix in three dimensions. If one imagines beginning with the fiber aligned with the z axis, the two bend components rotate the vector representing the first segment of the fiber by these two small rotations. Mathematically, this is done using a matrix multiplication. For small rotations, the simplified rotation matrix shown in equation (18) below can be used.

$$\overline{R_n} = \begin{bmatrix} 1 & 0 & \theta_{x,n} \\ 0 & 1 & \theta_{y,n} \\ -\theta_{x,n} & \theta_{y,n} & 1 \end{bmatrix} \qquad \text{Eq. 18}$$

The above rotation matrix is valid if $\theta_x \ll 1$ and $\theta_y \ll 1$. If the resolution of the system is on the order of micrometers, this is a condition that is not difficult to maintain. After rotation, the fiber segment will have a new end point and a new direction. All further bends are measured from this new pointing direction. Therefore, the pointing direction (or vector) at any position on the fiber depends upon all of the pointing directions between that location in the fiber and the starting location. The pointing vector at any point of the fiber can be solved in an iterative process tracking the rotational coordinate system along the length of the fiber as seen in the following expression:

$$\overline{C_{n+1}} = \overline{C_n R_n} \qquad \text{Eq. 19}$$

In other words, each segment along the fiber introduces a small rotation proportional to the size and direction of the bend along that segment. This iterative calculation can be written in mathematical notation below:

$$\overline{C_p} = \overline{C_0} \prod_{n=0}^{p} \overline{R_n} \qquad \text{Eq. 20}$$

Here again, for small rotations and nearly planar rotations, the angles are effectively summed, and by maintaining an accurate measure of the integral of the strain (the length change) throughout the length of the shape sensing fiber, better accuracy is achieved than is possible using the strain alone. The matrix calculated above contains information about the local orientation of the cores, which allows for the proper rotations to be applied. If the primary interest is in determining the position along the fiber, then only the local vector that describes the pointing direction of the fiber at that location is needed. This pointing vector can be found by a simple dot product operation.

$$P = \overline{C_0} \cdot \begin{bmatrix} 0 \\ 0 \\ 1 \end{bmatrix} \qquad \text{Eq. 21}$$

Figure 26:
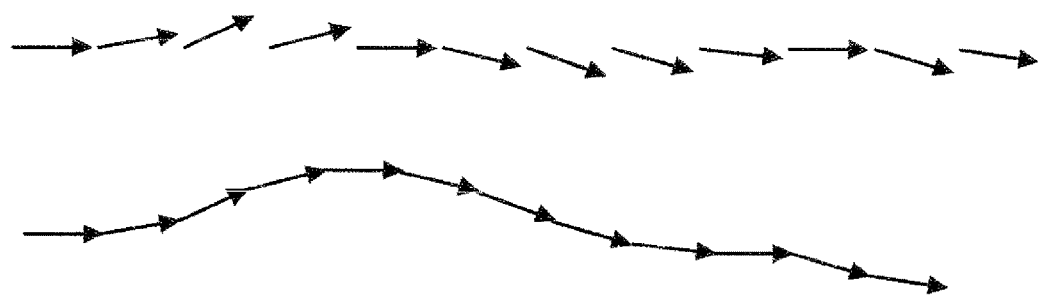
FIG. 26 illustrates that if each of multiple pointing vectors is placed head-to-tail an accurate measurement of the shape results.

If each of these pointing vectors is placed head-to-tail, as illustrated in the FIG. 26, an accurate measurement of the shape results. Thus, the position and/or direction at any point along the length of the fiber can be found by the summation of all previous pointing vectors, scaled to the resolution of the system:

$$\begin{bmatrix} x \\ y \\ z \end{bmatrix}_q = \Delta d \sum_{p=0}^{q} \left[ \left\{ \overline{C_0} \prod_{n=0}^{p} \overline{R_n} \right\} \right] \cdot \begin{bmatrix} 0 \\ 0 \\ 1 \end{bmatrix} \qquad \text{Eq. 22}$$

Figure 27:
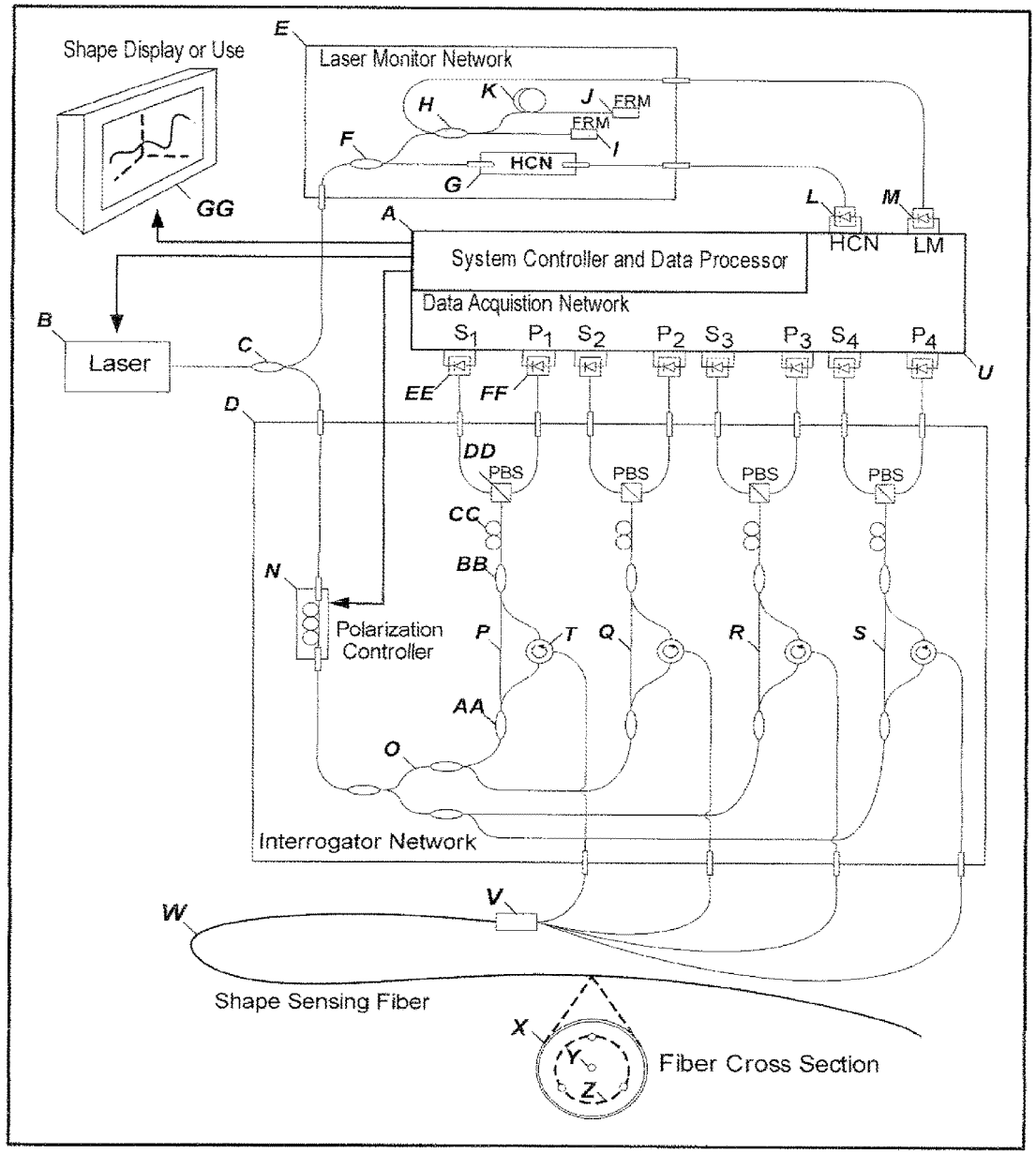
FIG. 27 is a non-limiting, example optical position and shape sensing system.

One non-limiting example of a shape sensing system is described in conjunction with FIG. 27. Other implementations and/or components may be used. Moreover, not every component shown is necessarily essential. The System Controller and data processor (A) initiates two consecutive sweeps of a tunable laser (B) over a defined wavelength range and tuning rate. Light emitted from the tunable laser is routed to two optical networks via an optical coupler (C). The first of these two optical networks is a Laser Monitor Network (E) while the second is designated as an Interrogator Network (D). Within the Laser Monitor Network (E), light is split via an optical coupler (F) and sent to a gas (e.g., Hydrogen Cyanide) cell reference (G) used for C-Band wavelength calibration. The gas cell spectrum is acquired by a photodiode detector (L) linked to a Data Acquisition Network (U).

The remaining portion of light split at optical coupler (F) is routed to an interferometer constructed from an optical coupler (H) attached to two Faraday Rotator Mirrors (I,J). The first Faraday Rotator Mirror (FRMs) (I) serves as the reference arm of the interferometer while the second Faraday Rotator Mirror (J) is distanced by a delay spool (K) of optical fiber. This interferometer produces a monitor signal that is used to correct for laser tuning nonlinearity and is acquired by the Data Acquisition Network (U) via a photodiode detector (M).

Light routed to the Interrogator Network (D) by optical coupler (C) enters a polarization controller (N) that rotates the laser light to an orthogonal state between the two successive laser scans. This light is then split via a series of optical couplers (O) evenly between four acquisition interferometers (P, Q, R, S). Within the acquisition interferometer for the central core, light is split between a reference path and a measurement path by an optical coupler (AA). The "probe" laser light from coupler AA passes through an optical circulator (T) and enters a central core of a shape sensing fiber (W) through a central core lead of a multi-core fanout (V) for the shape sensing fiber (W). The shape sensing fiber (W) contains a central optical core concentric to three helically wound outer optical cores. The cross section of the fiber (X) depicts that the outer cores (Z) are evenly spaced, concentric, and separated by a given radial distance from the central core (Y). The resulting Rayleigh backscatter of the central optical core (Y) as a consequence of a laser scan passes through the optical circulator (T) and interferes with the reference path light of the acquisition interferometer when recombined at optical coupler (BB).

The interference pattern passes through an optical polarization beam splitter (DD) separating the interference signal into the two principle polarization states (S1, P1). Each of the two polarization states is acquired by the Data Acquisition Network (U) using two photodiode detectors (EE, FF). A polarization rotator (CC) can be adjusted to balance the signals at the photodiode detectors. The outer optical cores of the shape sensing fiber are measured in a similar manner using corresponding acquisition interferometers (Q, R, S) and beam splitters separating the corresponding interference signals into their respective polarization states (S2, P2), (S3, P3), (S3, P3), and (S4, P4). The System Controller and Data Processor (A) interprets the signals of the four individual optical cores and produces a measurement of both position and orientation along the length of the shape sensing fiber (W). Data is then exported from the System Controller (A) for display and/or use (GG).

Birefringence Corrections

When an optical fiber is bent, the circular symmetry of the core is broken, and a preferential "vertical" and "horizontal" is created by the distinction between directions in the plane of the bend and perpendicular to the plane of the bend. Light traveling down the fiber then experiences different indices of refraction depending upon its polarization state. This change in the index as a function of polarization state is referred to as birefringence. This presents a significant problem for shape measurement because the measured phase change depends on the incident polarization state, and this incident state cannot be controlled in standard fiber.

Figure 28:
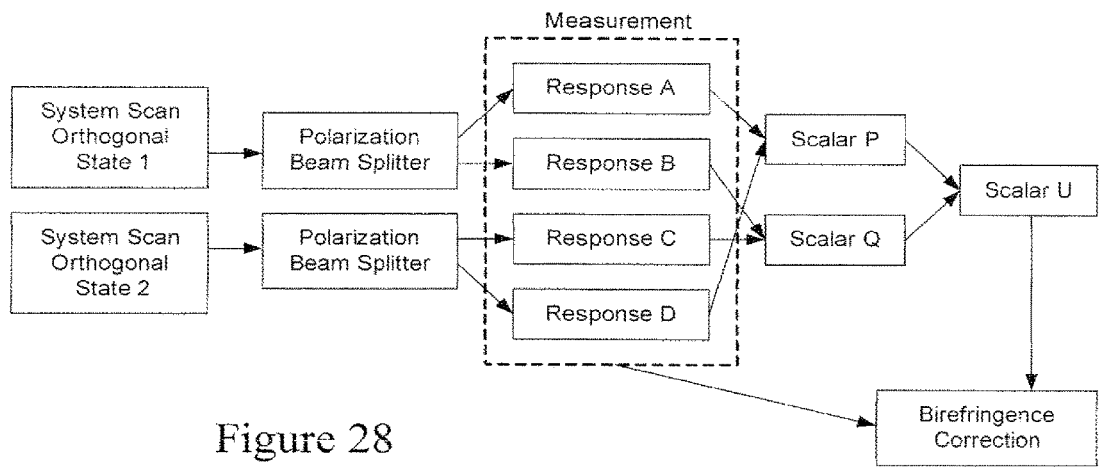
FIG. 28 is flowchart diagram illustrating non-limiting, example steps for calculating birefringence correction.

This problem can be solved by measuring the optical core response at two orthogonal polarization states. If the response of these two states is averaged properly, the variation in the measured response as a function of polarization can be eliminated or at least substantially reduced. The flowchart diagram in FIG. 28 outlines a non-limiting, example process for correcting for birefringence such as intrinsic birefringence, bend-induced birefringence, etc. both in measured and in reference values. The non-limiting example below relates to bend-induced birefringence but is more generally applicable to any birefringence.

The first step in the process is to measure the response of the core at two orthogonal polarization states called "s" and "p". An s response and a p response are measured at each polarization state resulting in four arrays. For simplicity, the responses to the first polarization state are called a and b, and the responses to the second polarization state are called c and d, where a and c are the responses at the s detector and b and d are the responses at the p detector.

The second step is to calculate the following two array products:

$$x = ad^*$$ Eq. 23

$$y = bc^*$$ Eq. 24

A low-pass filtered version of each of these signals is calculated which is written as, $\langle x \rangle$ and $\langle y \rangle$. The expected value notation is used here to indicate a low-pass filtering operation. The phases of the relatively slowly varying functions are used to align the higher frequency scatter signals in phase so that they can be added:

$$p = a + d e^{i \angle \langle x \rangle}$$ Eq. 25

$$q = b + c e^{i \angle \langle y \rangle}$$ Eq. 26

This process is then repeated to produce a final scalar value:

$$u = p + q e^{i \angle \langle p^* q \rangle}$$ Eq. 27

Now, a slowly varying vector can be created that represents the vector nature of the variation down the fiber without wideband Rayleigh scatter components, since these are all subsumed into u:

$$\vec{v} = [\langle a e^{i \angle u^*} \rangle, \langle b e^{i \angle u^*} \rangle, \langle c e^{i \angle u^*} \rangle, \langle d e^{i \angle u^*} \rangle]$$ Eq. 28

The correction due to birefringence effects is then calculated using:

$$\phi_n = \angle(\vec{v}_n \cdot \vec{v}_0^*)$$ Eq. 29 where $\phi_n$ is the correction due to birefringence effects and n is the index into the array. Here the vector is shown compared to the first element (index 0) in the array, but it can just as easily be compared with any arbitrarily selected element in the vector array.

The birefringence correction compensates for birefringence as result of core asymmetry during manufacture and for bend radii in excess of 100 mm. As the shape sensing fiber is placed into tight bends with radii less than 100 mm, a second order birefringence effect becomes significant.

Figure 29:
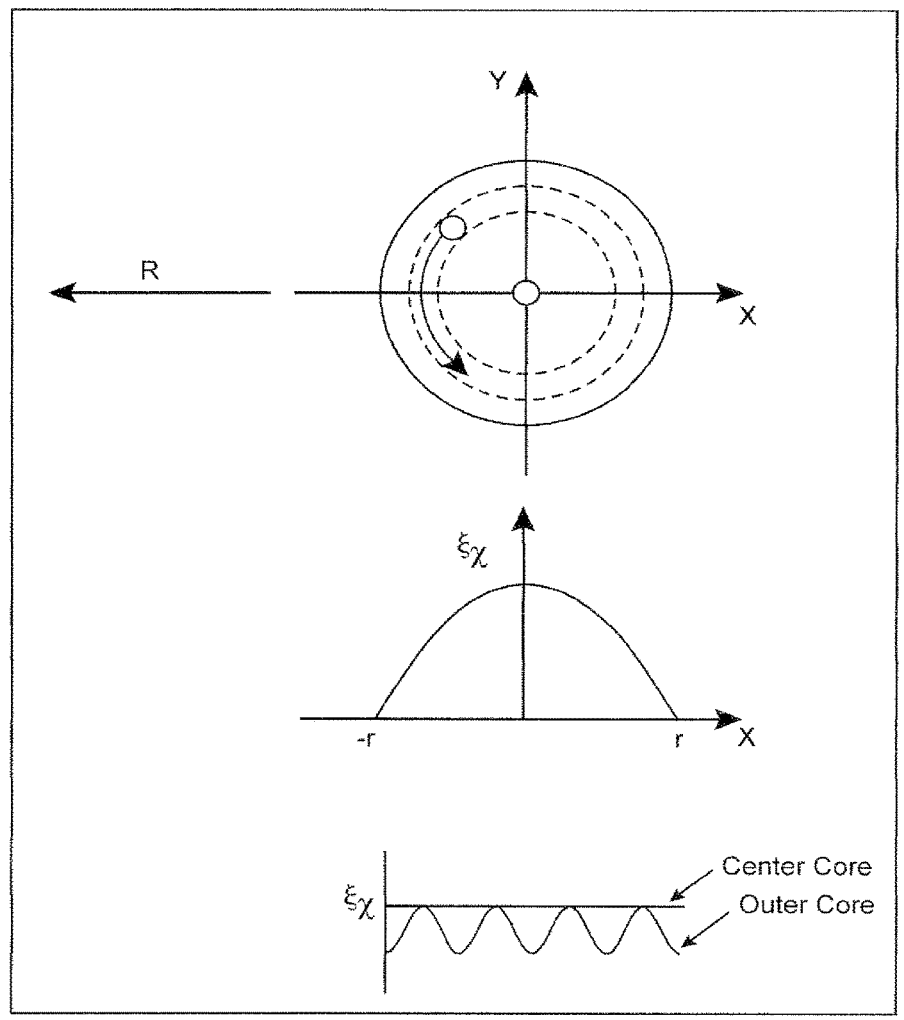
FIG. 29 shows a bend-induced strain profile of a cross section of a shape sensing fiber.

Assuming that significant levels of strain only manifest in the direction parallel to the central core of the multi-core shape sensing fiber, consider the diagram in FIG. 29. As the fiber is bent, tensile strain is measured in the region between $0 < X \leq r$ while compressive strain is measured in the region $-r \leq X < 0$. The expansion of the outer bend region exerts a lateral force increasing the internal pressure of the fiber. As the internal pressure of the fiber increases, a second order strain term becomes significant, $\epsilon_x$. As shown in the second graph, this pressure strain term is a maximum along the central axis of the fiber and falls off towards the outer edges of the fiber as the square of distance. In tight bends, this pressure strain term can modify the index of refraction of the fiber resulting in measurable birefringence. Further, the outer peripheral helical cores experience a sinusoidal response to this pressure induced strain while the center core responds to the maximum.

Figure 30:
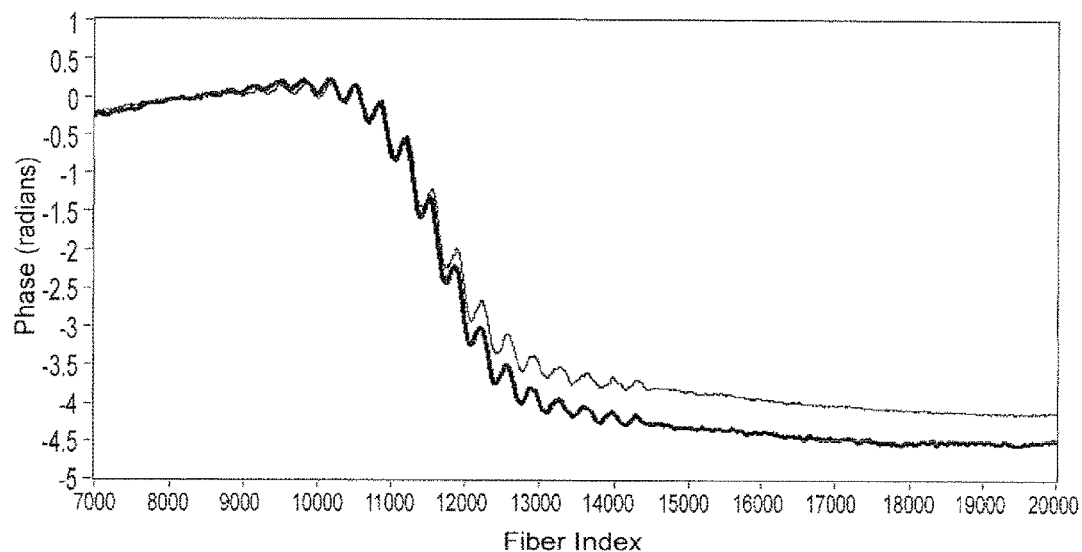
FIG. 30 shows two phase plots comparing a center core phase signal to an average phase of the outer cores.

FIG. 30 shows two phase plots produced from a 40 mm diameter fiber loop. Oscillations in these signals are a result of the multi-core assembly being off center of the fiber. In tighter bends, strain signals are high enough to elicit a response from this subtle deviation from concentricity. The plot shows that the average of the helical outer cores accumulates significantly less phase in the region of the bend when compared to the center core. This phase deficiency serves as evidence for bend induced birefringence. Recall that the extrinsic twist calculation is performed by finding the absolute phase difference between the center core and the average of the three outer cores. The graph in FIG. 30 shows that a false twist signal will be measured in the region of the bend.

The measured phase response of an outer core indicates its position relative to the pressure-induced strain profile, $\epsilon_x$. Therefore, the square of an outer core strain response provides a measure of both location and magnitude relative to the pressure field. This response may be scaled and used as a correction to the outer cores to match the level of $\epsilon_x$ perceived by the central core, thereby correcting for the false twist.

$$\phi_{ncorr} = \phi_n - k \int \left[ \left( \frac{d\phi_n}{dz} - \frac{\sum_{i=u}^{N} \frac{d\phi_n}{dz}}{N} \right)^2 \right]$$ Eq. 30

Figure 31:
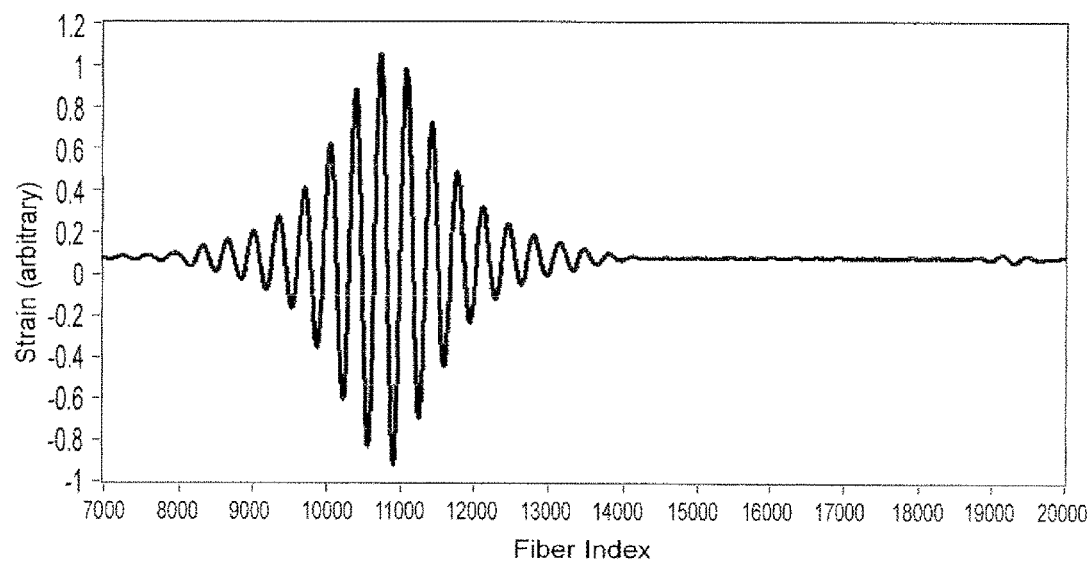
FIG. 31 shows an example strain response for an outer core for a 40 mm diameter fiber loop.
Figure 32:
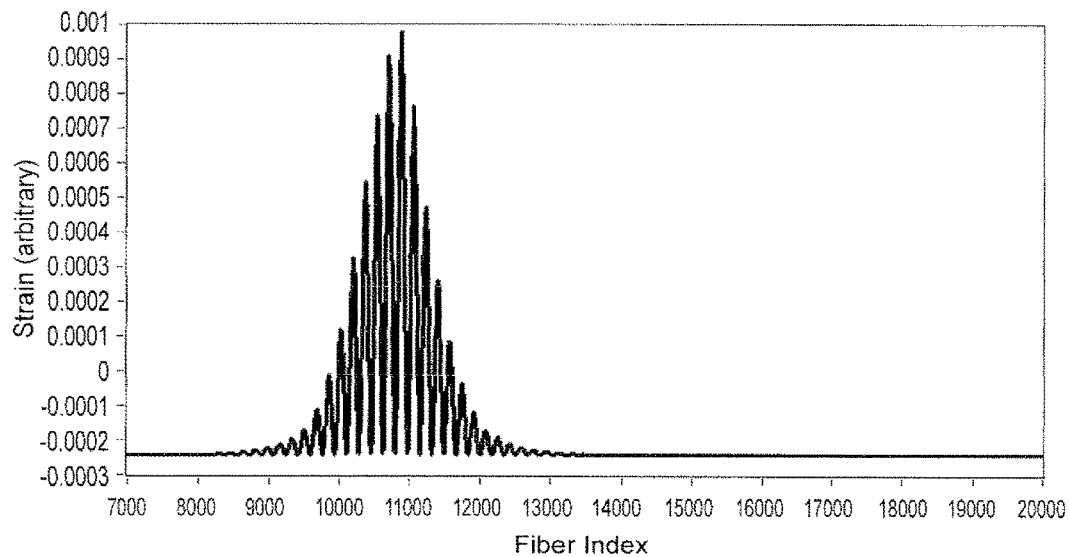
FIG. 32 is a graph showing a bend-induced birefringence correction for the 40 mm diameter fiber loop.

$\phi_n$ is the phase response on an outer core, N is the number of outer cores, and k serves as a scale factor. FIG. 31 shows the strain response of an outer core for a 40 mm diameter fiber loop, with common mode strain subtracted. From this strain response signal a correction for bend induced birefringence can be approximated as is seen in the graph shown in FIG. 32.

Figure 33:
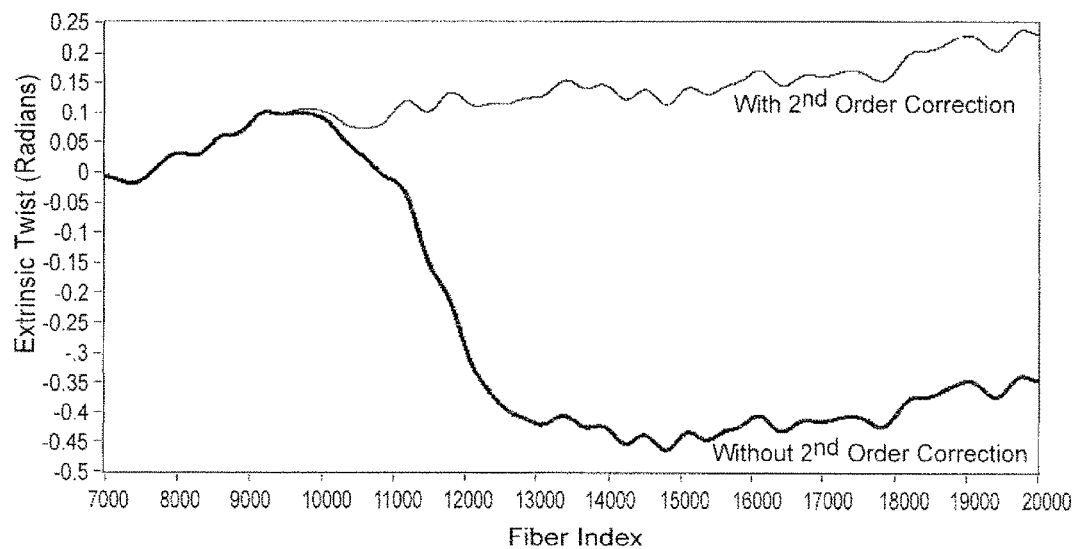
FIG. 33 is a graph comparing a twist signal with and without a $2^{nd}$ order birefringence correction.

Applying this correction has a significant impact on the measured twist in the region of the bend as shown in FIG. 33. Comparing the twist signal with and without $2^{nd}$ order correction reveals that a 25 degree error is accumulated in the bend region without the $2^{nd}$ order birefringence correction in this example.

Applying Birefringence Corrections and Impact on Accuracy

Figure 34:
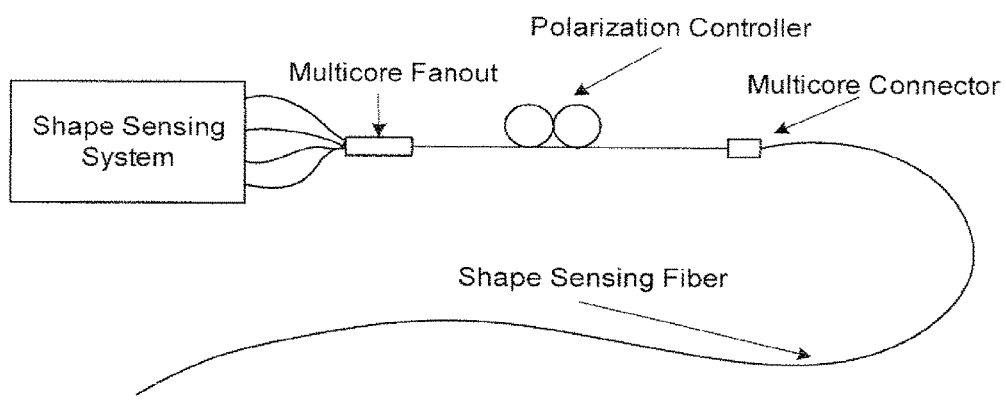
FIG. 34 shows a non-limiting, example loop polarization controller between a shape sensing fiber and a position and shape sensing system.

The following describes the effects of polarization on the accuracy of a shape sensing system. To achieve a varying input polarization between measurements, a loop polarization controller is added between the shape sensing fiber and the shape sensing system as illustrated in FIG. 34.

Figure 35:
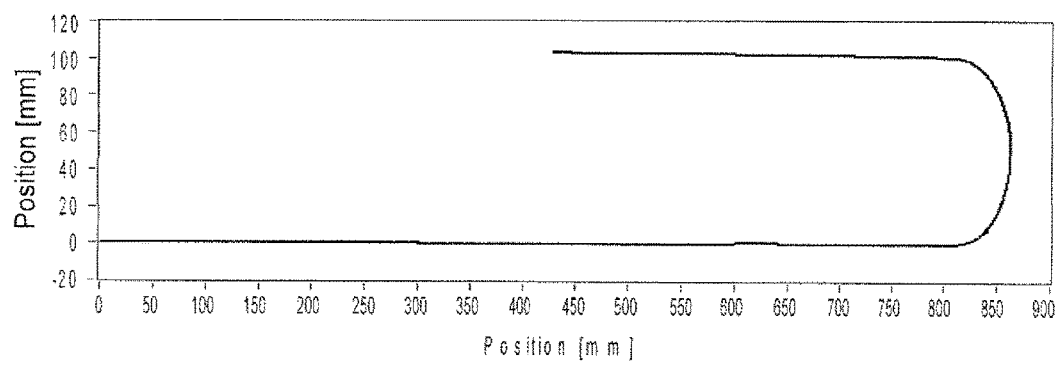
FIG. 35 shows an in-plane signal for a relatively simple shape where 1.4 meters of shape sensing fiber is routed through a single 180 degree turn with a bend radius of 50 mm.
Figure 36:
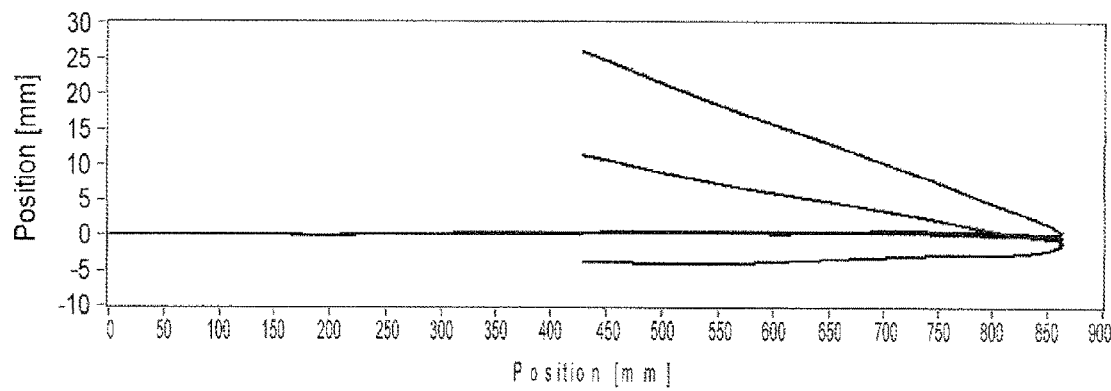
FIG. 36 shows three successive out-of-plane measurements where between each measurement, the polarization is varied using a polarization controller.

To illustrate the impact of the above-described corrections on the accuracy of the system, consider the in-plane signal for a relatively simple shape as shown in FIG. 35, where 1.4 meters of shape sensing fiber is routed through a single 180 degree turn with a bend radius of 50 mm. FIG. 36 shows out-of-plane measurements for three successive measurements. Between each measurement, the polarization is varied using the polarization controller in FIG. 34.

Figure 37:
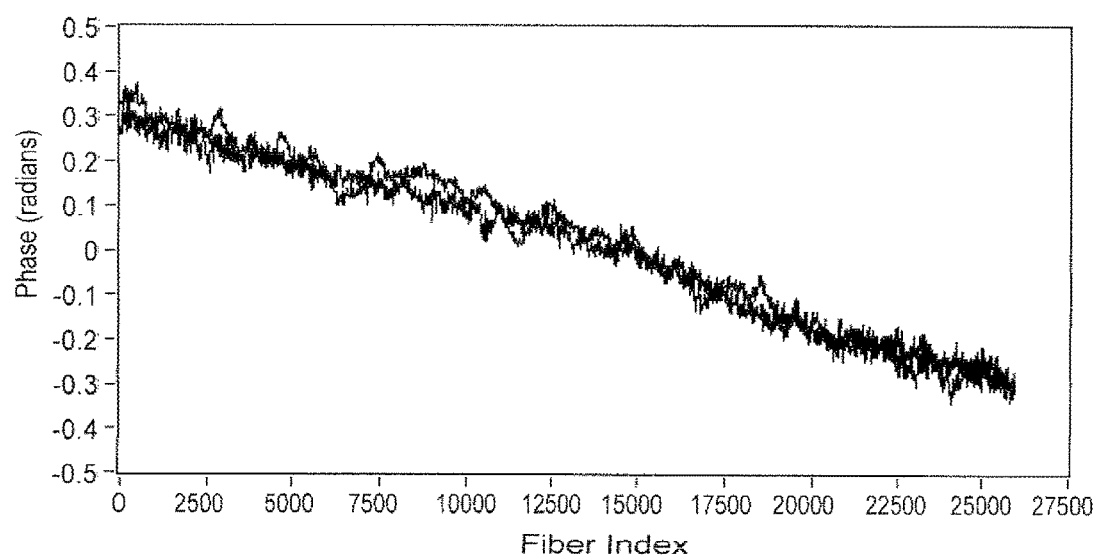
FIG. 37 is a graph showing an example that two successive measurements of the center core, with different input polarization states do not have a significant variation in phase response.
Figure 38:
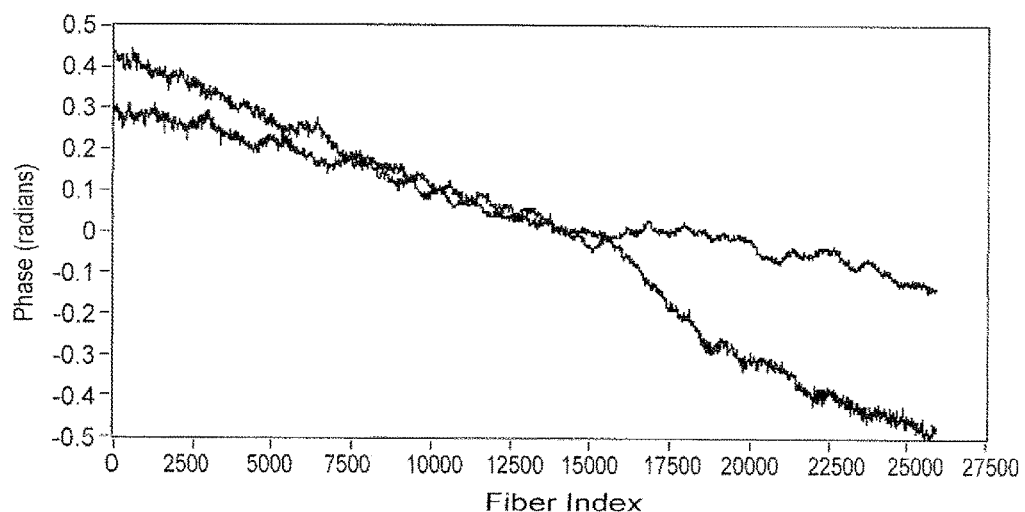
FIG. 38 is a graph showing an example that two successive measurements of an outer core respond differently to input polarization providing evidence for birefringence in the shape sensing fiber.

If birefringence is not considered, a significant loss in accuracy and precision is observed. A large response is observed in the out-of-plane signal as the polarization state is varied. The fiber picks up an angular error only in the region of the bend as a result of the system measuring an erroneous twist signal. Thus, when exiting this bend, there is a significant error in the pointing direction of the fiber. Predicting the polarization response of the fiber is a difficult problem, and not every core responds to the same extent for a given bend. FIG. 37 illustrates this point showing the birefringence corrections for cores. However, the same two measurements for the center core have a significant variation in their phase responses as seen in FIG. 38. Two successive measurements respond differently to input polarization providing evidence for birefringence in the shape sensing fiber.

Figure 39:
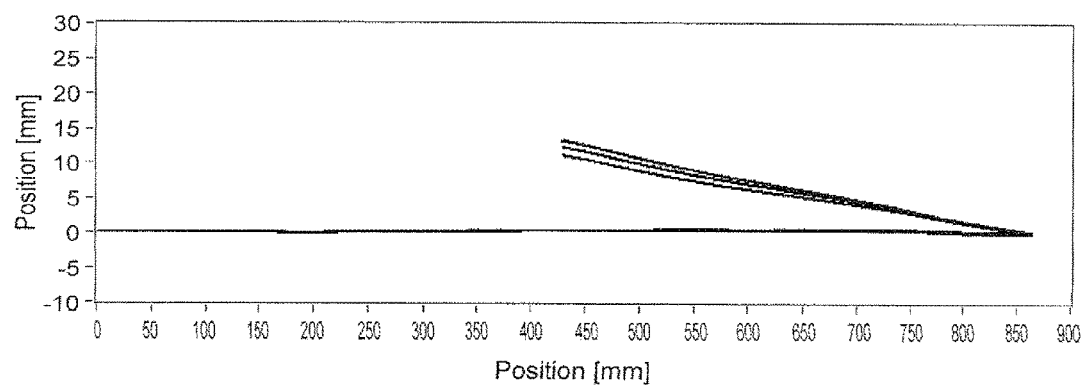
FIG. 39 is a graph showing that correcting for birefringence improved the precision of the system.
Figure 40:
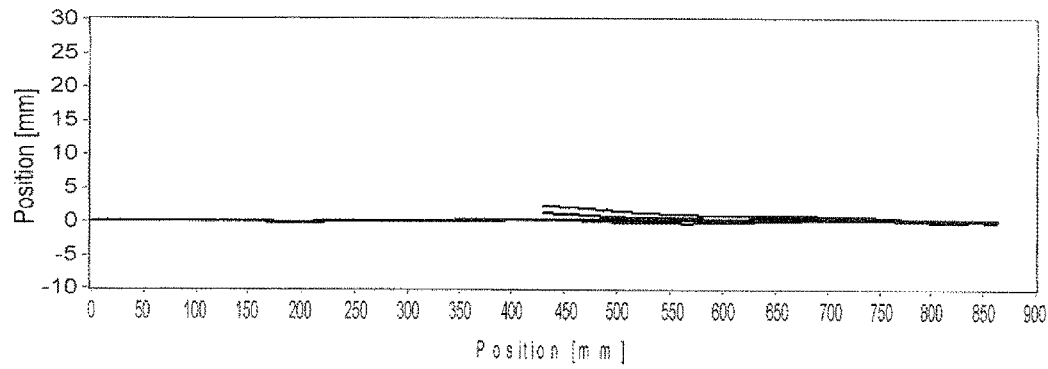
FIG. 40 is a graph showing that correcting for both first and second order birefringence improved the accuracy and precision of the system.

Activating a correction for birefringence improved the precision of the system as seen in FIG. 39. The variation between shape measurements as the input polarization state varies is minimized which greatly increases the precision of the system. However, a significant error in the accuracy of the system is still observed. If the second order correction based on bend induced birefringence is also performed, there is further improvement of the system as shown in FIG. 40. Both the precision and accuracy of the out of plane signal are dramatically improved.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A measurement method for an optical fiber having an optical core, comprising:
   tracking a change in phase associated with a strain on the optical core over a length of the optical core, where the tracked change in phase is proportional to a total change in optical length in the optical core of the optical fiber, the total change indicative of an accumulation of all changes in optical length for multiple segment lengths of the optical core up to a point on the optical core, and
   determining the strain over the length of the optical core based on the tracked change in phase.

2. The method in claim 1, wherein the tracking step includes:
   using optical frequency domain reflectometry (OFDR) to obtain phase data values along the optical core.

3. The method in claim 2, wherein the optical core is divided into multiple segments, and wherein the determining step further comprises:
   obtaining a reference measurement for each of the multiple segments for producing a reference data set for each of the multiple segments;
   obtaining a subsequent test measurement for each of the multiple segments for producing a test data set for each of the multiple segments;
   determining a delay to one segment in the multiple segments;
   adjusting the delay to the one segment to align the reference and test data sets; and
   calculating a phase change between the aligned reference and test data sets.

4. The method in claim 1, wherein the tracking step includes detecting an incremental change in optical length in the optical core in the optical fiber for each of the multiple segment lengths up to the point on the optical fiber, and wherein the total change in optical length is based on a combination of the incremental changes.

5. The method in claim 4, wherein the tracking step further includes detecting a phase response of a light signal reflected in the optical core of the optical fiber from the multiple segment lengths, and wherein strain on the optical fiber at the multiple segment lengths causes a phase shift in the reflected light signal from the multiple segment lengths in the optical core.

6. The method in claim 5, further comprising monitoring the phase response continuously along the optical length in the optical core of the optical fiber.

7. The method in claim 5, further comprising, for each segment length of the multiple segment lengths:
   detecting a reflected Rayleigh scatter pattern in the reflected light signal for each segment length,
   comparing the reflected Rayleigh scatter pattern with a reference Rayleigh scatter pattern for each segment length, and
   determining the phase response for each segment length based on the comparing.

8. The method in claim 1, further comprising:
calculating an optical phase change at each segment length of the multiple segment lengths along the optical fiber, and
unwrapping the optical phase change.

9. The method in claim 1, further comprising:
transmitting light with at least two polarization states along the optical fiber, and
combining reflections of the light with the at least two polarization states in determining changes in optical length.

10. The method in claim 9, wherein the two polarization states include a first polarization state and a second polarization state which are at least nominally orthogonal, and the method further comprises:
using a polarization controller to transmit a first light signal at the first polarization state along the optical fiber,
using the polarization controller to transmit a second light signal at the second polarization state along the optical fiber, and
calculating a polarization-independent change in optical length in the core of the optical fiber up to the point on the optical fiber using reflections of the first and second light signals.

11. An apparatus for making measurements of using an optical fiber having an optical core, comprising:
detection circuitry configured to track a change in phase associated with a strain on the optical core over a length of the optical core, where the tracked change in phase is proportional to a total change in optical length in the optical core in the optical fiber, the total change indicative of an accumulation of all of the changes in optical length for multiple segment lengths of the optical core up to a point on the optical fiber, and
processing circuitry configured to determine the strain over the length of the optical core based on the tracked change in phase.

12. The apparatus in claim 11, wherein the detection circuitry is configured to use optical frequency domain reflectometry to obtain phase data values along the optical core.

13. The apparatus in claim 12, wherein the optical core is divided into multiple segments, and wherein the detection circuitry is configured to:
obtain a reference measurement for each of the multiple segments for producing a reference data set for each of the multiple segments;
obtain a subsequent test measurement for each of the multiple segments for producing a test data set for each of the multiple segments;
determine a delay to one segment in the multiple segments;
adjust the delay to the one segment to align the reference and test data sets; and
calculate a phase change between the aligned reference and test data sets.

14. The apparatus in claim 11, wherein the detection circuitry is configured to track an incremental change in optical length in the optical core in the optical fiber for each of multiple segment lengths up to the point on the optical fiber, and wherein the total change in optical length is based on a combination of the incremental changes.

15. The apparatus in claim 11, wherein the detection circuitry is configured to detect a phase response of a light signal reflected in the optical core of the optical fiber from multiple segment lengths, and wherein strain on the optical fiber at the multiple segment lengths causes a phase shift in the reflected light signal from the multiple segment lengths in the optical core.

16. The apparatus in claim 15, wherein the detection circuitry is configured to monitor the phase response continuously along the optical length in the optical core of the optical fiber.

17. The apparatus in claim 15, the detection circuitry is configured to, for each segment length of the multiple segment lengths:
detect a reflected Rayleigh scatter pattern in the reflected light signal for each segment length,
compare the reflected Rayleigh scatter pattern with a reference Rayleigh scatter pattern for each segment length, and
determine the phase response for each segment length based on the comparison.

18. The apparatus in claim 11, wherein the processing circuitry is configured to calculate an optical phase change at each segment length of the multiple segment lengths along the optical fiber and to unwrap the optical phase change.

19. The apparatus in claim 11, further comprising:
a transmitter configured to transmit light with at least two polarization states along the optical fiber, and
a combiner configured to combine reflections of the light with the at least two polarization states in determining changes in optical length.

20. The apparatus in claim 19, wherein the two polarization states include a first polarization state and a second polarization state which are at least nominally orthogonal, the apparatus comprising:
a polarization controller configured to transmit a first light signal at the first polarization state along the optical fiber and a second light signal at the second polarization state along the optical fiber,
wherein the processing circuitry is configured to calculate a polarization-independent change in optical length in the core of the optical fiber up to the point on the optical fiber using reflections of the first and second light signals.

21. A non-transitory storage medium storing a program instructions which when executed by a computer system cause the computer system to make measurements using an optical fiber having an optical core by performing the following tasks:
tracking a change in phase associated with a strain on the optical core over a length of the optical core, where the tracked change in phase is proportional to a total change in optical length in the optical core of the optical fiber, the total change indicative of an accumulation of all changes in optical length for multiple segment lengths of the optical core up to a point on the optical fiber, and
determining the strain over the length of the optical core based on the tracked change in phase.

* * * * *